US011112858B2

United States Patent
Lyren et al.

(10) Patent No.: US 11,112,858 B2
(45) Date of Patent: *Sep. 7, 2021

(54) ELECTRONIC DEVICE DISPLAYS AN IMAGE OF AN OBSTRUCTED TARGET

(71) Applicants: Philip Lyren, Bangkok (TH); Robert Lyren, Bangkok (TH)

(72) Inventors: Philip Lyren, Bangkok (TH); Robert Lyren, Bangkok (TH)

(*) Notice: Subject to any disclaimer, the term of this patent is extended or adjusted under 35 U.S.C. 154(b) by 94 days.

This patent is subject to a terminal disclaimer.

(21) Appl. No.: 16/686,103

(22) Filed: Nov. 16, 2019

(65) Prior Publication Data

US 2020/0264696 A1 Aug. 20, 2020

Related U.S. Application Data

(63) Continuation of application No. 16/252,729, filed on Jan. 21, 2019, now Pat. No. 10,976,803, which is a continuation of application No. 15/784,230, filed on Oct. 16, 2017, now Pat. No. 10,191,538, which is a continuation of application No. 14/823,542, filed on Aug. 11, 2015, now Pat. No. 9,791,919.

(60) Provisional application No. 62/065,672, filed on Oct. 19, 2014.

(51) Int. Cl.
G06F 3/01 (2006.01)
H04W 4/02 (2018.01)

(52) U.S. Cl.
CPC ............ *G06F 3/011* (2013.01); *H04W 4/023* (2013.01)

(58) Field of Classification Search
CPC .................................. G06F 3/011; H04W 4/023
See application file for complete search history.

(56) References Cited

U.S. PATENT DOCUMENTS

| | | | |
|---|---|---|---|
| 2012/0236031 A1* | 9/2012 | Haddick | G06F 3/011 345/633 |
| 2014/0240350 A1* | 8/2014 | Chen | G06T 19/006 345/633 |
| 2014/0267400 A1* | 9/2014 | Mabbutt | G06F 1/163 345/633 |
| 2015/0071493 A1* | 3/2015 | Kajiwara | G06F 3/011 382/103 |
| 2015/0138099 A1* | 5/2015 | Major | G06F 3/017 345/173 |
| 2016/0055676 A1* | 2/2016 | Kasahara | G06T 19/006 345/633 |
| 2016/0109957 A1* | 4/2016 | Takashima | G06F 3/011 345/8 |

* cited by examiner

*Primary Examiner* — Yingchuan Zhang

(57) ABSTRACT

An electronic device determines information about a target and provides the information to another electronic device that has an obstructed view of the target. The other electronic device displays an image of the target with an orientation and a location of the target.

19 Claims, 11 Drawing Sheets

Collect, with a first electronic device at a first location, information about a target located at a location with a first orientation as seen from the first electronic device at the first location.
200

Build, from the information from the first electronic device, an image of the target having the first orientation as seen from the first location of the first electronic device.
210

Determine one or more objects that block and/or obstruct a second electronic device at a second location with a field of view that would include the target if the target were not being blocked and/or obstructed by the one or more objects.
220

Determine a second orientation for the target at the location that the second electronic device would see from the second location if the target were not being block and/or obstructed.
230

Display, with the second electronic device, the image of the target at the location with the second orientation.
240

Figure 2

ELECTRONIC DEVICE DISPLAYS AN IMAGE OF AN OBSTRUCTED TARGET

BACKGROUND

In order to gather information about a target, an electronic device should be within a predetermined range of the target and have an unobstructed view of the target. When the electronic device is outside of this range or the target is obstructed, the electronic device cannot gather information about the target or view the target.

BRIEF DESCRIPTION OF THE DRAWINGS

FIG. 2 is a method to display with an electronic device an image of a target with an orientation in accordance with an example embodiment.

SUMMARY OF THE INVENTION

Figure 1:
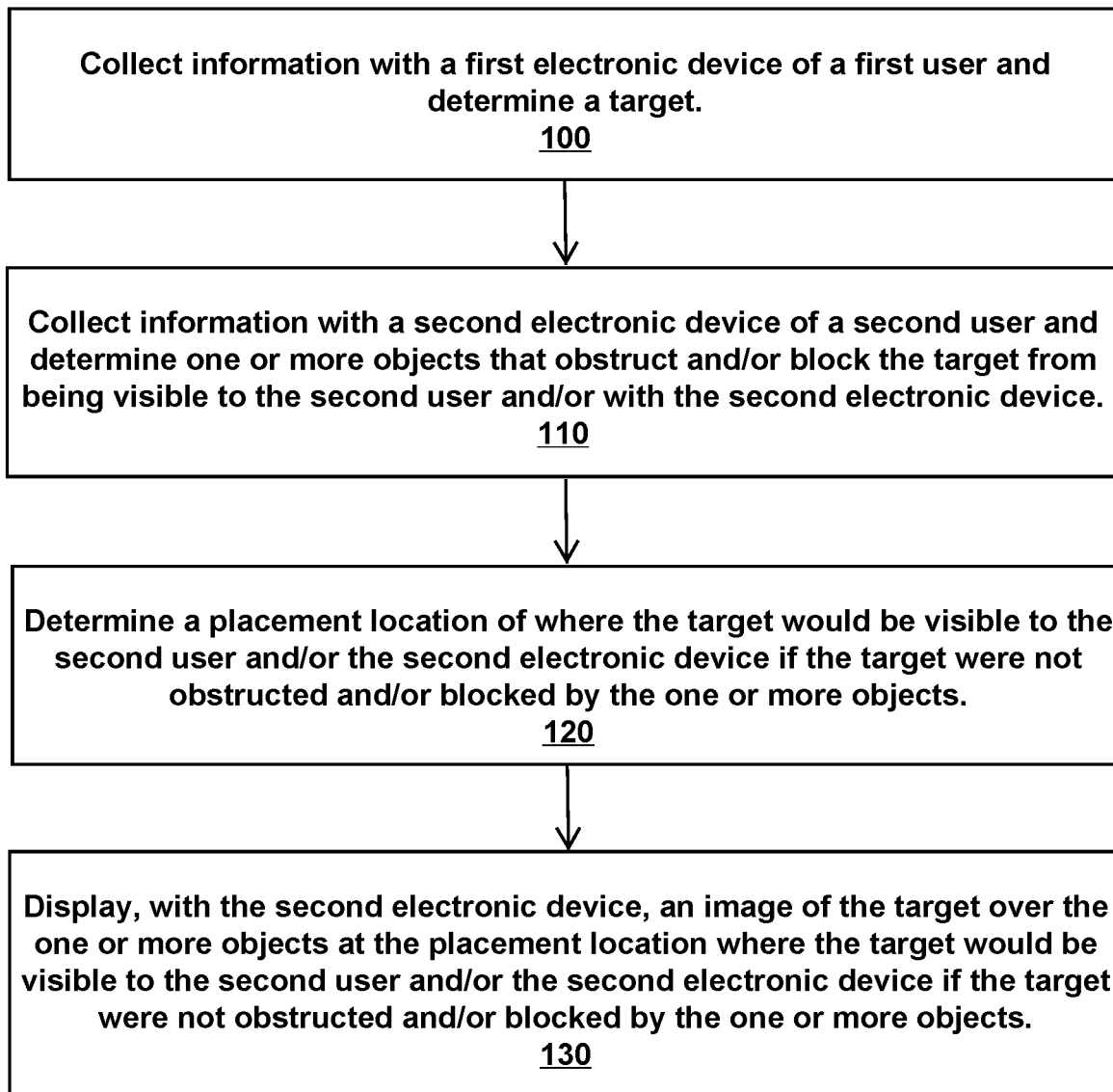
FIG. 1 is a method to display an image of a target at a placement location with an electronic device in accordance with an example embodiment.

Example embodiments include systems, apparatus, and methods that include one or more electronic devices that are configured to generate and/or display an image of a target that is obstructed from a view of the electronic device and/or a user of the electronic device.

Other example embodiments are discussed herein.

DETAILED DESCRIPTION

Example embodiments include systems, apparatus, and methods that include one or more electronic devices that are configured to generate and/or display an image of a target that is obstructed from a view of the electronic device and/or a user of the electronic device. The electronic device displays the image of the target to coincide with a location where the target exists and with an orientation that matches an orientation of the target as would be seen or sensed from the location of the electronic device displaying the image of the target.

In one example embodiment, the image of the target appears at a location in space on a display and/or in the view that corresponds to where the target would appear in the view if the target were not obstructed or if the target were viewable from the location of the electronic device or a user. Further, the image of the target is rotated or adjusted so its orientation being displayed matches or emulates a real-time orientation of the target that would appear on the display and/or in the view if the target were not obstructed or if the target were viewable from the location of the electronic device or a user.

Multiple images of the target can be simultaneously displayed on multiple different electronic devices that are each located at a different geographical location (e.g., located at different distances from the target). One or more of the electronic devices are not able to view, sense, and/or detect the target due to the distance from the electronic device to the target and/or due to an obstruction between the target and the electronic device. The electronic devices share information or data and/or obtain information or data from another electronic device in order to determine one or more of a location of the target, an identity of the target, a description of the target, an image of the target, an orientation of the target, an activity of the target, an area of the target, video and/or audio of the target or area of the target, a map or directions to the target, and a model of the target. Based on this information or data, the electronic devices display an image of the target that includes one or more of the location of the target, the identity of the target, the description of the target, the image of the target, the orientation of the target, the activity of the target, the area of the target, video and/or audio of the target or area of the target, a map or directions to the target, and the model of the target.

By way of example, this information and/or data can originate from an electronic device that determines, monitors, detects, tracks, senses, processes, and/or views the target and/or captures images or data of the target. For example, the electronic device can be proximate to the target (e.g., located within a few meters) or located a greater distance from the target (e.g., located more than one hundred meters or kilometers). As another example, one of the electronic devices can be located on the target, be located with the target, be part of the target, or be the target.

The image of the target can include a two-dimensional (2D) image or model, a three-dimensional (3D) image or model, a virtual image, and/or a virtual object. This image or model moves to match or emulate real-time movement of the target. Furthermore, an image displayed at each of the electronic devices resembles an orientation, size, and/or shape of how the target would appear in a field of view of each electronic device or a user of the electronic device if the target were not obstructed or if the target were viewable from the location of the electronic device or a user.

FIG. 1 is a method to display an image of a target at a placement location with an electronic device.

Block 100 states collect information with a first electronic device of a first user and determine a target.

By way of example, the target is one or more of a person, an object, a thing, or an area; and the first electronic device captures, obtains, records, provides, receives, and/or transmits information about the target. For instance, a first user wears and/or uses the first electronic device that captures and/or displays an image and/or video of the target, determines a distance to the target, determines a location of the target, captures a view of the target, senses a heat signature of the target, determines an identity of the target, or communicates with an electronic device at, with, or near the target.

The target can be determined with information from the first electronic device and/or another electronic device. As an example, the first electronic device senses a person, recognizes the person with facial recognition, and selects the person as the target. As another example, a handheld portable electronic device (HPED) captures images of an area and transmits these images over a network to a computer system. The computer system analyzes the images and selects a target that is located in the images and/or the area. As another example, a user views an area on a display of the first electronic device and interacts with the first electronic device through a user interface to select an object being displayed as the target. As yet another example, the first electronic device receives location or coordinate information for a target and then navigates to this location to determine the target.

Block 110 states collect information with a second electronic device of a second user and determine one or more objects that obstruct and/or block the target from being visible to the second user and/or with the second electronic device.

By way of example, the first electronic device and/or the second electronic device determines, captures, obtains, records, provides, receives, and/or transmits information about the one or more objects that obstruct and/or block the target from being visible with the second electronic device and/or being visible to a second person using the second electronic device. For instance, a user wears and/or uses the electronic device that captures and/or displays an image and/or video of the one or more objects.

The first and second electronic devices can be located at a geographical location and near or proximate each other (e.g., located within several feet from each other, located several yards or more away from each other, located within eye sight of each other, located within several hundred yards of each other, etc.). Alternatively, the first and second electronic devices are located at different geographical locations that are far from each other (e.g., located a kilometer or more apart, located in different cities or states, located in different countries, etc.).

Block 120 states determine a placement location of where the target would be visible to the second user and/or the second electronic device if the target were not obstructed and/or blocked by the one or more objects.

The one or more objects obstruct and/or block the second electronic device and/or the second person or user from seeing the target. For instance, an object occludes the second electronic device and/or second person from being able to capture an image of the target, detect the target, see the target, measure the target, or sense the target.

The placement location is the location or place of the target and/or area of the target where the target exists in a field of view of the electronic device and/or user (e.g., a user using, holding, or wearing the electronic device). From the point of view of the second electronic device, the placement location is where the target would be visible to the second electronic device and/or second person if the target were not obstructed and/or blocked by the one or more objects. For example, if the one or more objects did not occlude a line of sight of the second person, then the second person would be able to see with a naked eye the target at the placement location. As another example, if the one or more objects did not interfere with the second electronic device, then the second electronic device would be able to sense, detect, capture, and/or determine the location of or existence of the target.

Block 130 states display, with the second electronic device, an image of the target over the one or more objects at the placement location where the target would be visible to the second user and/or the second electronic device if the target were not obstructed and/or blocked by the one or more objects.

By way of example, the second electronic device provides or presents an image of the target on, over, with, and/or near the one or more objects such that the second user can see or detect the existence of the target. For instance, the second electronic device displays or presents one or more of two-dimensional (2D) images, three-dimensional (3D) images, virtual images, and/or virtual objects over or in place of the one or more objects such that the second user can see on the display a location, a distance, an orientation, a shape, a size, and/or an activity of the target.

Consider an example in which two users at a geographical location wear wearable electronic devices (WEDs) that capture, record, and transmit information concerning the users, the ambient environment, and people and objects at the geographical location. This information includes capture images and video within a field of view of the WEDs and/or users. A first one of the users looks at a window of a nearby building and sees a person holding an object. The WED of the first user records this event and determines a location of the person with respect to the first user. A second one of the users also looks at the window of the building or looks in the direction of the window but is unable to see the person holding the object since the second user is located away from the first user and sees the window at a different angle. The second person is not able to see with a naked eye the person holding the object since a portion of the building blocks the view of the second user. Based on the known location, size, and shape of the person and object, a virtual image of the person holding the object is created and provided to the WED of the second user. This virtual image is presented on or through the WED so the second user sees the image of the person holding the object while the second user looks at the window of the building even though the second person cannot see the actual, real person holding the object.

Consider an example in which a first user wears electronic glasses while located in a coffee shop, and a second user wears electronic glasses while located outside of the coffee shop. These electronic glasses capture images of the field of views of the users, build 3D images of these fields of view, and place these 3D images into a map that shows people and objects captured with the electronic glasses. The map can be supplemented with additional information, such as images, locations, objects, etc. previously recorded or stored from other users and/or other electronic devices. The first user sees a woman seated at a table in the coffee shop. The electronic glasses of the first user record the woman, the table, and the surrounding objects and provide these recordings to a software program that maps the woman, the table, and the surrounding objects into an interior map of the coffee shop. While looking at the coffee shop, the second user is unable to see the woman seated at the table and her surroundings since the structure of the coffee shop blocks the second user from seeing inside the coffee shop. The electronic glasses of the second user, however, overlay 3D images of the woman seated at the table such that the second user sees the woman seated at the table and her surroundings. Movements of the woman are recorded and provided to the map in real-time such that the 3D image of the woman moves in synchronization with actual movements of the woman in the coffee shop.

Consider an example in which a first soldier looks through electronic binoculars that capture, record, and transmit images seen through the electronic binoculars. The soldier and electronic binoculars view a combatant (e.g., a person) holding a weapon while located behind a wall. A second soldier attempts to view the combatant through an electronic scope that is mounted to his rifle. The second soldier cannot fire his rifle at the combatant since the wall partially or fully blocks his field of view of the combatant. The electronic binoculars and electronic scope communicate with each other over a peer-to-peer (P2P) network, and the electronic binoculars provide the electronic scope with combatant information. This combatant information includes a location and an identity of the combatant, a location and an identity of the weapon, 2D and/or 3D images of the combatant and the weapon, real-time movement of the combatant and the weapon. When the second soldier looks through his electronic scope, he sees an image of the combatant holding the weapon behind the wall. Although the second soldier cannot see the combatant and the weapon with a naked eye, he can see an image of the combatant and weapon. This image shows the location, position, and orientation of the combatant and the weapon and moves in real time to coincide with the movements of the actual combatant and weapon. The second soldier places a point of aim of the rifle on the image of the combatant and fires the rifle. A bullet from the rifle penetrates through the wall and strikes the combatant.

Consider an example in which smartphones of users capture information (such as global positioning system (GPS) and video information) and transmit this information over a network (such as the Internet or a private network) to a computer system that builds a map with the captured information. A user points a camera in his smartphone toward a building, and a display on the smartphone shows images of the interior of the building even though the interior of the building is not visible to the user. The smartphone communicates its field of views to the computer system that, in turn, retrieves a view from the map of the interior of the building and transmits this view to the smartphone. The smartphone displays the images of the interior of the building as if the interior were not being obstructed. As such, the user can see inside of the building even though the inside of the building is not visible to the naked eye of the user. Images of the interior of the building appear on the display as if an exterior portion of the building were not blocking the view of the smartphone and/or user.

Consider an example in which a first electronic device captures video of a person on a bicycle riding on the street. A second electronic device (in communication with the first electronic device) includes a camera that points in the direction of the street but cannot capture the person on the bicycle because a tree blocks the view of the person on the bicycle. A display of the second electronic device provides an augmented reality view in which a virtual image of the person on the bicycle is overlaid on the view of the real world as captured with the camera.

FIG. 2 is a method to display with an electronic device an image of target with an orientation.

Block 200 states collect, with a first electronic device at a first location, information about a target located at a location with a first orientation as seen from the first electronic device at the first location.

By way of example, the first electronic device determines, captures, obtains, records, provides, receives, and/or transmits information about the target. For instance, a first user wears and/or uses the first electronic device that captures and/or displays an image and/or video of the target.

The first electronic device at the first location collects the information with the target being situated at the location with the first orientation. This orientation represents a positional view of the target from the point of view of the first electronic device. For example, the first orientation represents a profile of the target as how the first electronic device and/or a first user sees or views the target from the first location.

Block 210 states build, from the information from the first electronic device, an image of the target having the first orientation as seen from the first location of the first electronic device.

For example, an electronic device builds a two-dimensional (2D) and/or three-dimensional (3D) image or model of the target. This image or model represents, emulates, or copies the target with the first orientation.

Block 220 states determine one or more objects that block and/or obstruct a second electronic device at a second location with a field of view that would include the target if the target were not being blocked and/or obstructed by the one or more objects.

For example, but for the target being blocked and/or obstructed, the second electronic device would see, view, sense, capture, display, and/or include the target at the location of the target. The target may not be visible and/or detectable to the electronic device for other reasons, such as the electronic device being too far away from the target to sense or detect the target or weather or ambient conditions prevent the electronic device from sensing or detecting the target.

Block 230 states determine a second orientation for the target at the location that the second electronic device would see from the second location if the target were not being blocked and/or obstructed.

The second orientation represents a positional view of the target from the point of view of the second electronic device and/or a second user. For example, the second orientation represents how the second electronic device and/or the second user would see or view the target from the second location. For instance, the second orientation shows how the target would be seen with a naked eye of the second user, or how the target would be seen with the second electronic device but for target being blocked, but for a far distance to the target, or but for environmental conditions that prevent the second user and/or second electronic device from seeing, detecting, or sensing the target.

Block 240 states display, with the second electronic device, the image of the target at the location with the second orientation.

An example embodiment builds the image of the target with information collected with one or more electronic devices that view the target, sense the target, and/or receive information about the target (e.g., receive or obtain information about the target from another electronic device or input from a user). For instance, a 2D or 3D image or model of the target is built from pictures, video, or other data captured from an electronic device.

By way of example, an image processor or digital image processor converts images (such as photos) or video into 3D images, 3D pictures, or 3D models. For example, a 3D modeler converts a photo into a bitmap image, vectorizes and extrapolates the image, and generates a 3D model of the photo. As another example, 2D images are combined and/or offset to generate a stereoscopic image that provides 3D depth perception. As another example, a 3D converter converts 2D video into 3D video. As another example, a 3D modeler receives a series of photos of a target from multiple views, matches the views, calculates spatial positioning, and generates a 3D point-cloud model that is rotatable three hundred and sixty degrees (360°). As another example, a photo-modeler performs image based modeling and close range photogrammetry (CRP) to generate measurements from photos and produce 3D models. As another example, a 3D modeler retrieves one or more aerial and/or ground photos and executes aerial photogrammetry to generate 2D or 3D models (such as a topographical map or a 3D landscape). As another example, a 3D modeler processes video images and renders these images into a rotatable two-dimensional image. As another example, a 3D modeler processes photos and/or video and generates one or more of a polygonal model of the image, a curve model, and a digital sculpture.

The 2D and 3D images represent the target with an orientation from a point of view or field of view of the viewer and/or the electronic device at a particular location and at a particular point in time. This orientation would change with movement of the target and/or change when a location of the viewer and/or the electronic device changed. For example, another viewer and/or another electronic device located away from the electronic device capturing the information would see or view a different orientation of the target. This difference in orientation depends on a difference in one or more angles from the target to the other viewer and/or the other electronic device with respect to one or more angles from the target to the location of the electronic device capturing the information. Thus, an example embodiment changes an orientation of the target depending on a location of the viewer or viewing electronic device with respect to the target. Changing the orientation presents the image of the target as the target would be seen or viewed if they were not blocked and/or obstructed.

For example in an X-Y-Z coordinate system, an image of target is rotated about one or more of the X-axis, Y-axis, and Z-axis to change from one orientation to another orientation. For instance, a first electronic device at coordinate location (X1, Y1, Z1) captures an image of a person at a coordinate location (X2, Y2, Z1) and with a first orientation. The first electronic device builds a 3D image of this person having the first orientation. A second electronic device at coordinate location (X3, Y3, Z1) attempts to view the person at location (X2, Y2, Z1), but an object blocks the second electronic device from viewing the person. The second electronic device displays the 3D image of the person at the coordinate location (X2, Y2, Z1) and with a second orientation. This second orientation is derived from the 3D image based on a change or difference between coordinate location (X1, Y1, Z1) and coordinate location (X3, Y3, Z1). For instance, a geometric and/or trigonometric evaluation of this difference reveals that coordinate location (X3, Y3, Z1) is located along a line in the X-Y plane that is positive forty-five degrees (45°) away from coordinate location (X1, Y1, Z1). The 3D image of the person captured from coordinate location (X1, Y1, Z1) is rotated in the X-Y plane negative forty-five degrees (45°) and displayed on the second electronic device with this rotated orientation. Alternatively, a new 3D image is built from the point of view of coordinate location (X3, Y3, Z1). In both scenarios, the second electronic device displays a view or orientation of the 3D image of the person that matches the view or orientation of the person that the second electronic device would see, sense, or view if the object did not block the second electronic device from seeing, sensing, or viewing the person.

Information collected from or with one or more electronic devices assists in determining what orientation to build and/or present to which electronic device and where placement locations of images are for different electronic devices and/or users. By way of example, this information includes, but is not limited to, one or more of a Global Positioning System (GPS) location, a distance from one electronic device to another electronic device, a distance from an electronic device to the target, a direction of a view (such as a direction of a field of view, a point of aim, a line of sight, a line of departure, a head of a user, an eyesight of user, and a gaze of a user), an angle or difference in angle between two electronic devices and/or an electronic device and the target.

A human and/or one or more electronic devices can determine the direction of a view of a user and/or an electronic device with respect to the target. For example, instruments to measure the direction of the view include, but are not limited to, a compass, a magnetometer, a heading indicator, an inclinometer, a gyroscope, an accelerometer, a sensor, or other electrical device to determine direction. Furthermore, triangulation and/or trigonometric identities or functions can be used to calculate distances, angles between two or more objects and/or two or more points, locations of targets with respect to different electronic devices, placement locations, orientations, etc. For example, a laser determines a distance from a weapon to the target, and a compass determines a direction of a point of aim of the weapon on the target. An adjustment to an orientation of an image of the target is based on knowing this distance and direction.

By way of example, the second electronic device provides or presents an image of the target on, over, with, and/or near the one or more objects such that the second user can see or detect the existence of the target. For instance, the second electronic device displays one or more of 2D images, 3D images, and/or virtual images over or in place of the one or more objects such that the second user can see on the display a location, a distance, an orientation, a shape, a size, and/or an activity of the target.

The first user at the first location and the second user at the second location can view the target with one or more different orientations. By way of example, these orientations include, but are not limited to, the orientation from the point of view or location of the first user and/or first electronic device, the orientation from the point of view or location of the second user and/or second electronic device, an orientation from the point of view or location of the another user and/or another electronic device, a movable, variable, and/or adjustable orientation (e.g., a user being able to move or set an orientation to view the target), a preset or predetermined orientation (e.g., an orientation that a user or electronic device establishes or selects), a random orientation, an orientation based on a previously selected or viewed orientation, a favorite or preferred orientation, and an orientation based on a position, orientation, and/or location of a user or electronic device with respect to the target.

Consider an example in which a first user wears a first WED that captures an image of a person in a building while standing in a doorway that leads to an alley. The first user stands in the alley and in front of the person such that the first WED captures a frontal image of the person standing in the doorway and facing the alley. A second user located in the building wears a second WED that communicates with the first WED. The second user stands in a room that is directly behind the person but a wall blocks the second person from seeing the person standing in the doorway. A field of view of the second user would include a view of the back of the person standing in the doorway but for the wall blocking the second person and second WED from viewing the person. A 3D image of the person standing in the doorway is built from the information collected with the first WED. This 3D image is built from the front orientation of the person standing in the doorway since this front orientation of the person is what the first WED sees and captures. The second WED and second user, however, are located behind the person and would not see the frontal orientation of the person, but instead would see a back orientation of the person. The first and second users would see a different orientation of the person standing in the doorway since they are located at different locations with respect to the person. In order to compensate for the difference in location between the first and second users, the second WED is presented with a different orientation of the person. For example, the second WED displays the back orientation of the person standing in the doorway since this is the orientation that the second user or second WED would view or see if the person were visible and not obstructed from the wall blocking the second person and second WED from viewing the person.

Figure 3:
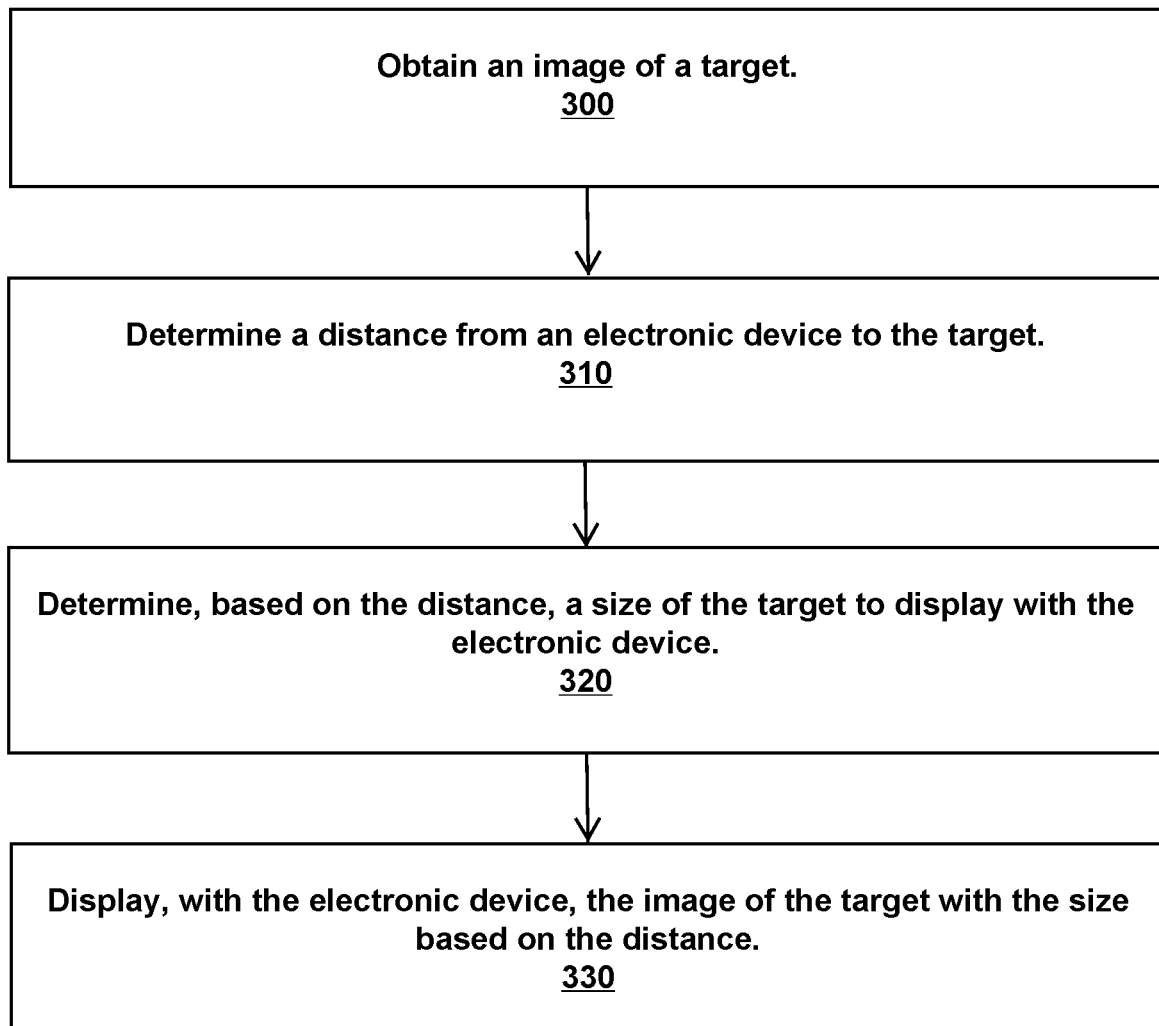
FIG. 3 is a method to display with an electronic device an image of a target with a size based on a distance from the electronic device to the target in accordance with an example embodiment.

FIG. 3 is a method to display with an electronic device an image of a target with a size based on a distance from the electronic device to the target.

Block 300 states obtain an image of a target.

For example, an electronic device determines, builds, retrieves, transmits, receives, and/or processes the image of the target.

Block 310 states determine a distance from an electronic device to the target.

An electronic or mechanical device measures a distance from the electronic device to the target. For example, a laser rangefinder determines a distance to the target. As another example, a mil dot scope or milliradian scope provides information to determine a distance to target. As another example, GPS coordinates or satellite position information provides a distance to the target. As yet another example, a camera determines a distance to the target. As yet another example, a user provides or inputs a distance to the target. As yet another example, a radio transmitter and receiver use radio waves or electromagnetic waves to determine a distance to the target.

The electronic or mechanical device used to measure distance can be a separate device (such as a standalone device) or device integrated with or attached to another electronic device (such as a weapon, a projectile, or another electronic device). For example, electronic and/or mechanical devices in a bow or a firearm determine a distance to the target. As another example, electronic and/or mechanical devices in one or more of a wearable electronic device (WED), handheld portable electronic device (HPED), computer, server, and a satellite determine a distance to the target.

Block 320 states determine, based on the distance, a size of the target to display with the electronic device.

By way of example, image size is inversely proportional to object distance and directly proportional to focal length. As a distance between a user and the target increases, the image size of the target decreases. As the distance between the user and the target decreases, the image size of the target increases. As another example, the size of the target is relates to a distance of the electronic device to the target. Targets are displayed with a first size given distances in a first range; targets are displayed with a second size given distances in a second range; targets are displayed with a third size given distances in a third range; etc. As another example, targets that would not be visible with a naked eye are displayed with a predetermined size. As another example, the size of the displayed target is proportional to or relates to the distance of the electronic device to the target.

Block 330 states display, with the electronic device, the image of the target with the size based on the distance.

The electronic device can display, provide, present, or project the image of the target with or without magnification of the target. For example, the image of the target appears on the display with a size that is equivalent to a size of the target as seen from the location or distance of the viewer or electronic device viewing the target.

A size of the target gives a clue or indication of the distance from the viewer to the target. For example, an automobile that is fifty meters (50 m) from a viewer has a size that is much different than this automobile when it is one hundred meters (100 m) from the viewer. Based on a size of the automobile in the field of view, the viewer can estimate a distance from the viewer to the automobile.

Consider an example in which a user wears electronic glasses in a library while waiting to meet a friend. An electronic device of the friend communicates information of the friend to the electronic glasses while the friend walks to the library. By way of example, this information includes a GPS location of the friend, an image of the friend, an orientation of the friend, a direction in which the friend is moving and/or facing, a rate of movement (e.g., a speed or velocity of the friend), images of an area of the friend, audio and/or video at or near the friend, an activity of the friend, images of other electronic devices capturing the friend, etc. The user's electronic glasses display an indication in a field of view of the user to show the user where the friend is located with respect to where the user is located. For instance, a visual indication shows the user in which direction to look to see an image of the friend with the image being displayed at the location where the friend is actually located. Without the electronic glasses, the user would not be able to see the friend walking to the library since the structure of the library and objects located outside of the library obstruct and/or block the user from seeing the friend. The electronic glasses, however, provide a moving image of the friend as the friend walks to the library. This image appears in the field of view of the electronic glasses when the user looks in the direction where the friend is located. The image also includes an area adjacent to the friend, such as a portion of the sidewalk or outdoor environment near the friend. This adjacent area provides a frame of reference or location information as to where the friend is currently located and/or what activity the friend is currently performing. For instance, the user sees 3D images or video of the friend, sidewalk, street, and nearby tree. From these images, the user sees that the friend is located on the sidewalk and walking toward the library. The user sees a life-like image of his friend and sees what his friend is doing while situated in the library.

Consider an example in which soldiers equipped with electronic devices are dispersed in a large office building while searching for a combatant. A first soldier sees the combatant in a room 520 on the fifth floor and transmits an image of the combatant at this location to the other soldiers. A second soldier is also located on the fifth floor but is forty meters (40 m) away in another room. When the second soldier looks toward room 520, the second soldier sees a 3D image of the combatant. A size of the 3D image of the combatant emulates a size of the combatant that the soldier would see while looking to room 520 if his field of view and line of sight to the combatant were not obstructed. The size of the combatant gives an indication to the soldier as to how far away the combatant is from the soldier. The 3D image also shows a portion of room 520 in order to indicate a location or environment in which the combatant is situated. A third soldier is located on the third floor and in a room that is located under room 520. When the third soldier looks upward toward the location of room 520, the third soldier sees a 3D image of the combatant. The 3D image of the combatant shows a view or orientation of the combatant that emulates the orientation of the combatant that the soldier would see while looking upward to room 520 if his field of view and line of sight to the combatant were not obstructed.

Consider further the example above in which the soldiers are dispersed in the office building. The 3D image of the combatant displayed to the third soldier shows a view as seen from underneath the combatant. For example, the third soldier sees the bottom of the feet of the combatant while the combatant stands in room 520. This view, however, does not show a face of the combatant or whether the combatant is holding a weapon. The third soldier switches views to see the view being provided to or the view from the point-of-view of the first soldier. The view of the first soldier shows a more complete profile of the combatant and includes a face of the combatant and an image of a weapon that the combatant is holding. The second soldier also wants to change a view of the combatant. Instead of switching views with another soldier, the third soldier interacts with his electronic device to rotate the 3D image of the combatant being displayed to the third soldier. This rotated image changes the orientation of the combatant and provides the third soldier with a three hundred and sixty degree (360°) rotating view of the combatant.

Consider further the example above in which the soldiers are dispersed in the office building. An electronic device of the first soldier continues to capture images of the combatant while the combatant is located in room 520 and transmits or provides these images to the electronic devices of the other soldiers. When the second soldier looks in the direction of room 520, the second soldier sees an image of the combatant that moves in real-time with movements of the combatant. As such, the second soldier can view a real-time image, location, distance, and orientation of the combatant. When the second soldier moves his field of view or line of sight away from room 520, the 3D image of the combatant disappears or changes (such as minimizes or reduces on the display, moves to another location on the display, changes to a new window, or is replaced with another image, such as an image indicating a location and/or presence of the combatant).

Consider further the example above in which the soldiers are dispersed in the office building. A fourth soldier with an electronic device is located on the seventh floor at an opposite side of the office building from the combatant. A blinking light appears on a display of his electronic device. This light indicates the discovery of the combatant and also provides an indication or direction where the fourth soldier should look to see the combatant. The fourth soldier looks toward room 520 on the fifth floor, but the 3D image of the combatant displayed on his electronic device is small since the fourth soldier is located forty-five meters (45 m) from room 520. The fourth soldier interacts with his electronic device to enhance or magnify the displayed view or image of the combatant. This enhanced or magnified view or image of the combatant provides more detail and emulates a view as if the fourth soldier were located three meters away from the combatant.

Consider further the example above in which the soldiers are dispersed in the office building. A fifth soldier is located away from the building and has no frame of reference for where room 520 is located. An electronic device of the fifth soldier displays a virtual image of the combatant holding a virtual object of a firearm in a virtual room shown as room 520. Based on this information, the fifth soldier determines that the combatant is armed and located in a room.

Figure 4:
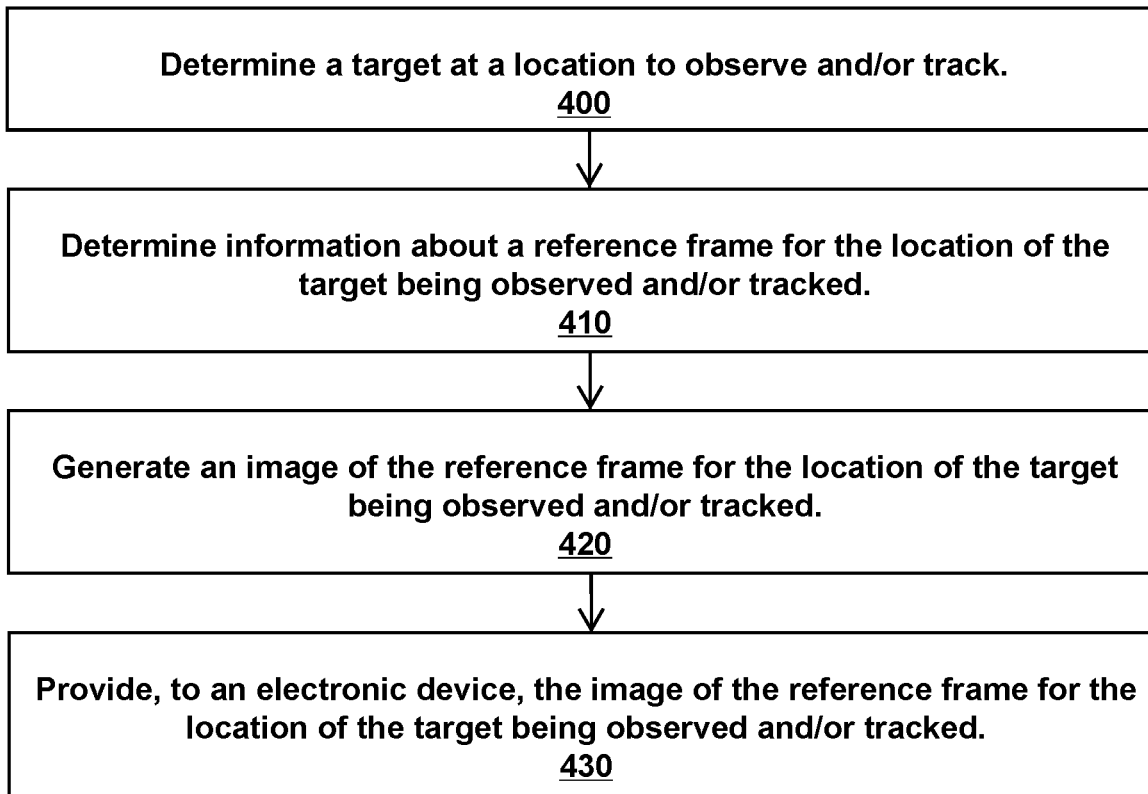
FIG. 4 is a method to provide an image of a reference frame of a target to an electronic device in accordance with an example embodiment.

FIG. 4 is a method to provide an image of a reference frame of a target to an electronic device.

Block 400 states determine a target at a location to observe and/or track.

An electronic device and/or a human determines the target at the location to observe and/or track. For example, selection of the target is based on one or more of facial recognition or identification of the person, recognition or identification of the object, gaze tracking of the person and/or the user, eye tracking of the person and/or the user, length of time a user looks at the target, user input to an electronic device (such as voice input, gesture input, or input through a user interface), the location of the target, input from an electronic device, input from a third party, and activity or movement of the target.

Block 410 states determine information about a reference frame for the location of the target being observed and/or tracked.

The information about the reference frame for the location includes one or more of a GPS location or coordinates of the location, a description of the location, an address of the location, an image and/or video of the location, an image and/or video of surrounding or adjacent locations, an image and/or video of a path a user traveled to arrive at the location, aerial and/or satellite views or images of the location and/or surrounding locations, a map of the location and/or surrounding locations, rendered images of the location and/or surrounding locations, and information downloaded and/or obtained from the Internet, a website, or a database.

Block 420 states generate an image of the reference frame for the location of the target being observed and/or tracked.

For example, the image includes photographs, video, audio, 2D images, 3D images, graphics, models, and displayed data and/or information.

Block 430 states provide, to an electronic device, the image of the reference frame for the location of the target being observed and/or tracked.

For example, the image of the reference frame is stored, transmitted, processed, displayed, or provided to the electronic device.

The reference frame assists a user in determining a perspective or a frame of reference for a location or activity of the target and/or an image or model of the target. For example, when an electronic device is aimed or pointed in a direction of the target, an image of the target displays on the electronic device even though the target is too far away for the electronic device to capture. This displayed image may not provide sufficient information for a user to determine a frame of reference for where the target is actually located or for what the target is actually doing. The image of the reference frame assists in providing this information.

By way of example, the reference frame information includes, but is not limited to, an aerial view of the target, an enlarged view of the target, a view of the target and surrounding area, prior activity of the target, movements or locations of the target before arriving at the current location or before commencing the current activity, locations and activities of people, animals, and/or objects near the target, a map of an area of the target, historical information, and other information to assist a user and/or electronic device in obtaining a frame of reference for or about the target, a location of the target, an activity of the target, persons and/or objects associated with the target, etc.

Consider an example in which an image of John transmits to an electronic device of John's parents. The image shows John working on a circuit board at a workstation. John's parents, however, cannot determine from the displayed images where John is located or why he is working on the circuit board. Images of a reference frame then display on the electronic device. These images of the reference frame show John is located in a large airplane hangar with a hundred other people who are busy building a jetliner. John is working on a circuit board that relates to the construction of the jetliner. John's parents now have a frame of reference for where John is located and what John is doing.

Consider an example in which police officers travel to an area to find a criminal suspect. An electronic device of one police officer captures images of people at the area and identifies the criminal suspect with facial recognition software. Instead of apprehending the criminal suspect, the police officer requests the assistance of other police officers in the area. These other police officers, however, are dispersed throughout the area and are unaware of the location of the criminal suspect. Based on captured images and satellite images, the electronic device generates a short video that shows the location of the police officer, the location of the criminal suspect, and a map showing how each police officer can travel to the location of the criminal suspect. This video plays on electronic devices of the other officers so they can see where the police officer and criminal suspect are located. In addition, the electronic device of the police officer captures video of the criminal suspect at the location, and this video is rendered or generated 3D images or video that are transmitted to a map and/or electronic devices of the other police officers. When a police officer looks at the map of the location of the criminal suspect or when a police officer turns his or her head to look in a direction of the location of the criminal suspect, the 3D images or video display to the looking police officer. In this manner, the looking police officer has a reference frame and can see real-time activity and location of the criminal suspect.

Consider an example in which two friends (John and Paul) decided to meet at a restaurant. John arrives first and waits for Paul who is late. John and Paul are members or friends on a social network that enables these two individuals to share real-time location information about each other. John interacts with his electronic glasses to request a location of Paul who, unknown to John, is sitting in a taxicab in transit to the restaurant. John's electronic glasses display a visual indication for John to look in a North East direction. Paul's electronic glasses capture images or video of him leaving his apartment, hailing a taxicab, entering the taxicab, and his current field of view while sitting in the taxicab. John moves his head to the indicated direction on the display and sees 3D imagery of Paul sitting in a taxicab. John sees what Paul sees or what Paul's electronic device has captured or is capturing. Images in John's field of view are 3D transparent line drawings that are superimposed over or onto his field of view through the electronic glasses. This imagery includes a short frame of reference to show the current activity and location of Paul. This frame of reference includes imagery of Paul hailing the taxicab and entering into the taxicab. John further sees Paul sitting in the taxicab as it travels on a nearby road toward the restaurant. Based on the size of the taxicab in his field of view, John estimates that the taxicab is turning into the parking lot of the restaurant and is one hundred yards away.

Consider an example in which a soldier views, through an electronic scope mounted to a rifle, a combatant with a weapon on a balcony of a building. The electronic scope determines information about the combatant that includes an identity of the individual, an identity of the weapon, a distance to the combatant, a GPS location of the combatant and the soldier, prior criminal activity or history of the combatant, capture or kill instructions for the identified combatant, a location of the combatant in the building, blueprints and/or a map of the building, a placement and/or location of the combatant on the map, and video of the combatant. The electronic device further visually highlights or outlines the combatant on its display and tracks movement of the combatant. Real time images of the combatant captured with the electronic scope are transmitted to electronic devices of other soldiers and a command center with a commanding officer. In order to provide a reference frame for a location of the combatant and/or soldier, the electronic scope (or another electronic device in communication with the electronic scope) generates imagery of the reference frame to assist the other soldiers and commanding officer in quickly ascertaining a location and activity of the combatant and/or soldier. For instance, this imagery includes one or more of images of a wide angle shot of the building taken from successively farther locations away to show a close-up of the building and balcony, a medium shot of the building, a far shot showing the entire building, a street map or aerial view with the building highlighted, and an address of the building. This imagery plays on displays of the other soldiers and commanding officer and then is followed with real-time imagery of the combatant being captured with the electronic scope. The imagery also includes a map marked with the location of the combatant.

In an example embodiment, different reference frames and/or different views are provided to different users based on, for example, an identity of a user, a current or previous location of a user, access privileges of a user, a relationship with the user, a rank or status of a user, knowledge of a user, activity of a user, an electronic device of a user, a distance of the user from the target, etc.

Consider an example in which John has an electronic device that captures and records his field of view. John desires to share (with two friends Simon and Paul) images of his friend (Alice) who is located in his field of view. Alice and John sit across from each other on benches in a park. Simon is also located nearby in the park, but Paul is located several miles away in his apartment. Based on the proximity of Simon to John and/or Alice, John's electronic device sends Simon's electronic device imagery of a close-up of Alice sitting on the park bench. Other images in John's field of view are removed from the imagery sent to the Simon's electronic device. Simon does not need to see the surrounding images of Alice since Simon is also located in the park and can determine the frame of reference for the location from the close-up image of Alice. Based on the far distance of Paul to John and/or Alice, John's electronic device sends Paul's electronic device imagery of Alice sitting on the park bench along with additional imagery. This imagery includes images of Paul's field of view that surround Alice, images Paul's electronic device captured while entering the park before capturing the images of Alice, and images of a sign that shows the name of the park. These additional images are sent to John's electronic device since John is not aware that Paul is located in the park. These additional images enable John to quickly determine a frame of reference for the location of the images of Alice being streamed to his electronic device.

Figure 5:
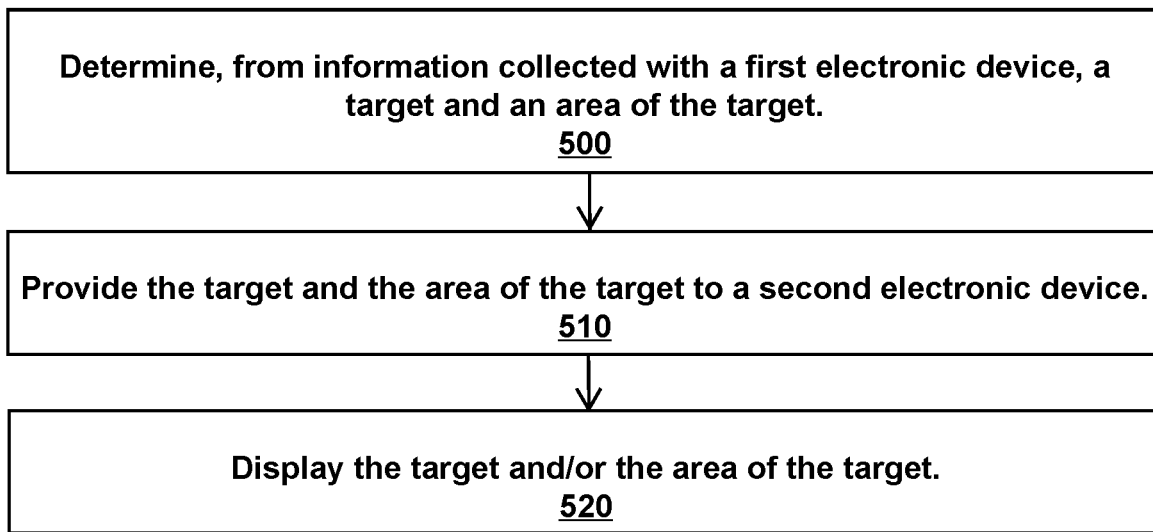
FIG. 5 is a method to display a target and an area of the target in accordance with an example embodiment.

FIG. 5 is a method to display a target and an area of the target.

Block 500 states determine, from information collected with a first electronic device, a target and an area of the target.

By way of example, the area of the target includes, but is not limited to, an area around the target, near or proximate or adjacent the target, encompassing the target, touching the target, with the target, enclosing the target, accompanying the target, above the target, below the target, surrounding the target, providing a frame of reference for the target, and associated with the target. Further, the area can include one or more of a person, a thing, an object, and space (including occupied and unoccupied space).

By way of further example, a determination is made of a boundary or perimeter of the target. This boundary or perimeter defines a location of the target. The area of the target includes an area that surrounds the boundary or the perimeter. For instance, if the target is a person, then the area of the target could be a chair in which the person is sitting, a car that the person is driving, a room in which the person is located, a hill that the person is climbing, etc. Furthermore, the area of the target can be a predetermined or specified distance or area. For instance, if the target is a person, then the area of the target includes everything within a certain distance from the target (e.g., an area within one foot, within two feet, within one yard, within two yards, within three yards, etc.).

The area of the target can also be defined according to content or context of the area. For example, the area of the target includes or extends to weapons near or with the target, drugs near or with the target, people near or with the target, vehicles near or with the target, ammunition near or with the target, electronic devices near or with the target, etc. As another example, the area of the target is based on an activity of the target. For instance, if the target is a person, then the area of the target includes a bicycle that the person is riding, a car that the person is driving, a book that the person is reading, an electronic device that the person is holding, an animal that the person is walking, a third party with whom the person is talking, a firearm that the person is carrying or firing, a field where the person is walking, etc.

The area of the target can also be determined based on a distance, such as a distance of a user and/or an electronic device from the target. For example, an area of the target increases as a distance between the target and the first electronic device increases. As another example, an area of the target decreases as a distance between the target and the first electronic device decreases. As another example, an area of the target increases as a distance between the target and the first electronic device decreases. As another example, an area of the target decreases as a distance between the target and the first electronic device increases.

The area of the target can also be based on a size of the target. For example, an area of the target increases as a size of the target increases. As another example, an area of the target decreases as a size of the target decreases. As another example, an area of the target decreases as a size of the target increases. As another example, an area of the target increases as a size of the target decreases.

The area of the target can also be based on an amount of space the target occupies in the field of view of the user and/or electronic device. For example, an area of the target increases as an amount of space in the field of view that the target occupies increases. As another example, an area of the target decreases as an amount of space in the field of view that the target occupies decreases. As another example, an area of the target decreases as an amount of space in the field of view that the target occupies increases. As another example, an area of the target increases as an amount of space in the field of view that the target occupies decreases. As yet another example, if a target occupies X percent (X %) of the field of view (where X is a positive number between 0 and 100), then an area of the target occupies a percentage of the field of view based on a function of X. For instance, the function of X is X times N (where N is a positive number), X divided by N, X plus N, X minus N, etc.

The target and the area of the target can also be based on a predetermined size or proportion of a field of view of the user and/or electronic device. For example, the target and/or area of the target are sized to occupy a certain percentage of a field of view of an electronic device (such as occupy 5% of the field of view, 10% of the field of view, 15% of the field of view, 20% of the field of view, 25% of the field of view, etc.).

Block 510 states provide the target and the area of the target to a second electronic device.

For example, the first electronic device transmits the target and/or area of the target to a second electronic device (such as a WED, WEG, HPED, computer, server, electronic scope, network location, electronic binoculars, smartphone, network, memory, database, etc.). As another example, the target and/or area of the target are stored to memory or provided to a network location and retrieved or received with the second electronic device.

Block 520 states display the target and/or the area of the target.

The target and/or the area of the target are displayed on the first electronic device, the second electronic device, and/or another electronic device with a display.

Consider an example in which an electronic device of a first soldier views a target (e.g., a combatant standing in a bunker) located fifty meters (50 m) from the first soldier. The electronic device transmits a notification of the combatant to a second soldier who wears electronic glasses and is located one kilometer from the combatant. The second soldier is too far way to see the combatant with a naked eye so a size of the target and area of the target (i.e., the combatant and the bunker) is enlarged. When the second soldier turns his head and gazes his eyes in the direction of the target, the electronic glasses display an enlarged 3D image of the combatant standing in the bunker. This 3D image occupies about 5%-10% of the display space of the electronic glasses and includes a visual indication of the location and distance to the target. For instance, the electronic glasses display the following information when the second soldier looks in a West direction of two hundred and seventy degrees (270°): "Target Heading: 270°, Target Distance: 1 km". When the second soldier turns his head away from the target (e.g., his field of view no longer includes the target in the West direction), the 3D image of the target disappears from the display.

In an example embodiment, the target and/or area of the target is viewable when the user and/or electronic device is directed to a location of the target and/or area of the target. This provides the user and/or electronic device with a location and/or direction of the target and/or area of the target.

An example embodiment determines an overlap in different fields of view from different electronic devices and confirms or adjusts an accuracy of information received from the different electronic devices. This confirmation or adjustment can assist in determining a level or amount of confidence of information being determined.

Consider an example in which two electronic devices collect information about a target in their respective fields of view. Image analysis of this information reveals that an overlap area exists between a field of view of the two electronic devices. A comparison is made of the information collected with the first electronic device in the overlap area with the information collected with the second electronic device in the overlap area. A determination is made, based on this comparison, an accuracy of information in the overlap area. Displays of the first and second electronic devices display the information and the accuracy of the information to users of the electronic devices.

Consider further the example in which the two electronic devices collect information about the target in their respective fields of view. Each electronic device determines one or more of a distance to the target, an identity of the target, a location of the target, an orientation of the target, an activity of the target, movement of the target, and other information discussed herein. The information determined with each of these two electronic devices is compared to determine an accuracy of the information. For example, both electronic devices provide images that confirm an identity of the target is a person named R. Louis. As another example, information from the first electronic device determines that the target includes a person that stands five feet ten inches tall (5'10"), and information from the second electronic device determines that the target includes a person that stands five feet eleven inches tall (5'11"). A determination is made that the target has a height between 5'10" and 5'11". As another example, information from each of the electronic devices determines that the target includes a person holding a weapon. This information from two independent sources confirms that the target is armed and dangerous.

Figure 6A:
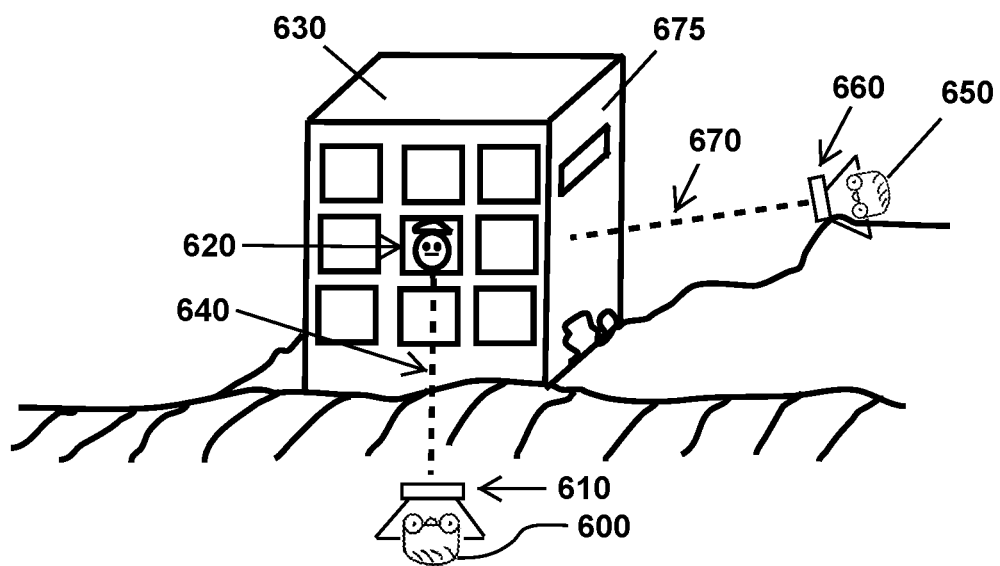
FIG. 6A shows a first user with a first electronic device that collects information about a target in accordance with an example embodiment.

FIG. 6A shows a first user 600 with a first electronic device 610 that collects information about a target 620 located on a second floor of a building 630. The first user 600 and/or first electronic device 610 have an unobstructed view or line of sight 640 to the target 620. A second user 650 with a second electronic device 660 has an obstructed view or line of sight 670 to the target 620 since a side 675 of the building 630 blocks or impedes the second user 650 and/or second electronic device 660 from viewing, sensing, detecting, and/or perceiving the target 620.

The first electronic device 610 shares information with the second electronic device 660 so the second electronic device 660 can display or provide information about the target. By way of example, this information includes an image or model of the target, a location of the target, an orientation of the target, an object with the target, an activity of the target, a direction to the target, a distance to the target, a view of the target, and other information determined with the first electronic device and/or obtained from another electronic device.

Figure 6B:
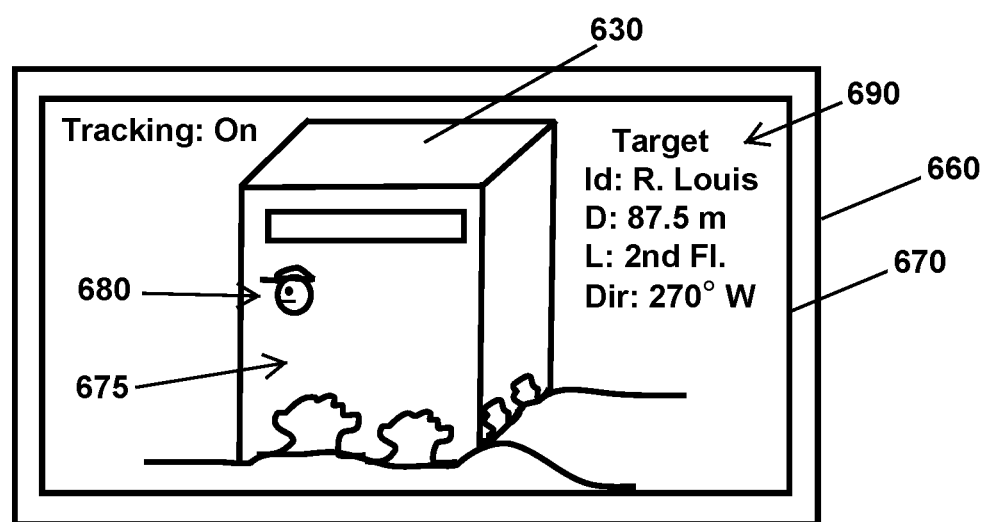
FIG. 6B shows a second electronic device with a display that displays a field of view that includes an image or model of the target and additional information about the target in accordance with an example embodiment.

FIG. 6B shows the second electronic device 660 with a display 670 that displays a field of view that includes an image or model 680 of the target and additional information 690 about the target. By way of example, this additional information 690 includes an identification (Id) or name of the target (shown as "R. Louis"), a distance (D) from the second electronic device to the target (shown as "87.5 m"), a location of the target on the second floor of the building 630 (shown as "2nd Fl."), and a compass or heading direction to the target (shown as "270° W"). The display 670 as indicates that a location and movement of the target are being tracked (shown as "Tracking: On").

The side 675 of the building 630 blocks the second user 650 and/or second electronic device 660 from seeing the target 620. For example, a camera, scope, viewfinder, or other mechanical or electrical viewing device on the second electronic device 650 is not able to see or capture a photo, video, or other information of the target 620 since the building obstructs the line of sight. Further, the second user 650 also would not be able to view the target with a naked eye since the building obstructs a view to the target. The second electronic device 650, however, provides an image or model 680 of target 620 so the user can see the target.

As shown in FIG. 6A, the first user 600 and first electronic device 610 view a front orientation or front profile of the target 620 since the target (which is a person) faces the first user and first electronic device. Viewing the target with this orientation, the first electronic device captures an image, photo, or video of the target and determines other information (such as an identity of the target with a facial recognition program, a GPS location of the target, a distance to the target, an identity or existence of weapons or other objects with or near the target with an object recognition program, and an activity of the target).

As shown in FIG. 6B, the second electronic device 660 displays a side orientation or side profile of the target 620 since a side of the target (which is a person) faces the second user and second electronic device. The second electronic device displays an image of the target in an orientation or profile that matches an orientation or a profile of what the second electronic device and/or second user would see if the view or line of sight to the target were not obstructed. The image displayed on the second electronic device also matches a size and shape of the target that the second electronic device and/or second user would see if the view or line of sight to the target were not obstructed. Further, a placement location of the image of the target in the building matches the actual physical location in the building where the target is located.

The image 680 of the target 620 disappears or is removed from the display 670 when a line of sight of the user 650 and/or second electronic device 660 does not include the location of where the target 620 is situated. For example, when the user 650 and second electronic device 660 move the line of sight 670 or field of view away from the building 630, the user and the second electronic device would no longer be able to see the target even without the obstructions. When this movement occurs, the target is removed from the display since the target is no longer in the field of view of the user and the second electronic device.

Figure 7A:
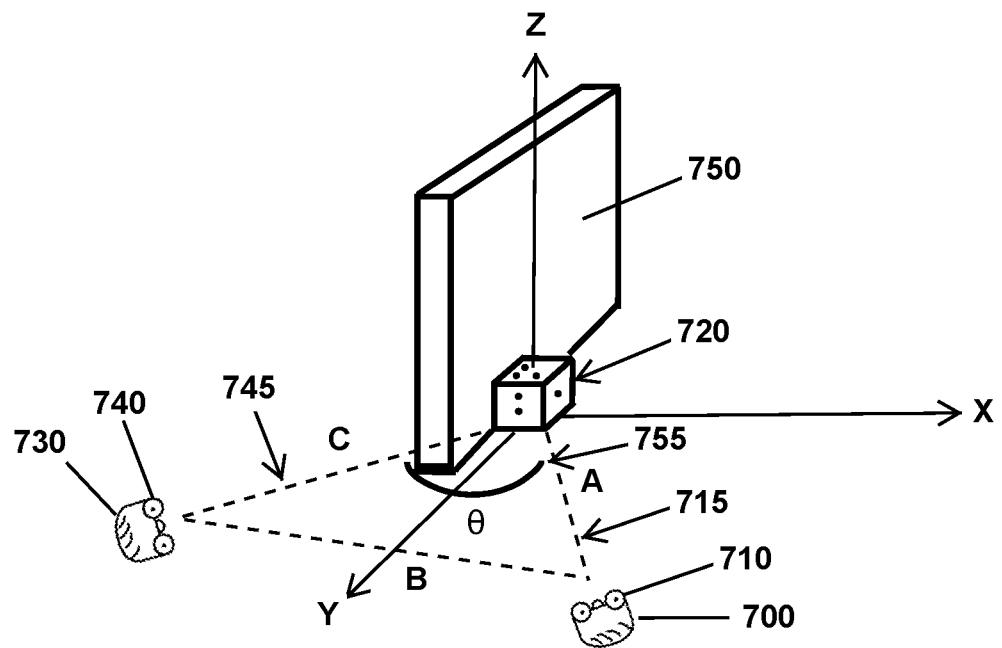
FIG. 7A shows a user wearing a wearable electronic device with a view or line of sight to a target in accordance with an example embodiment.

The image 680 of the target 620 remains on the display 670 when the line of sight 640 or field of view of the user 600 and/or first electronic device 610 does not include the location of where the target 620 is situated. For example, when the user 600 and first electronic device 610 move the line of sight 640 or field of view away from the building 675, the image 680 of the target 620 remains displayed on the second electronic device 660. The second electronic device 660 knows a location and other information of the target and can track the target (e.g., using infrared or information received from another electronic device). FIG. 7A shows a user 700 wearing a wearable electronic device 710 with a view or line of sight 715 to a target 720. Another user 730 wears a wearable electronic device 740 with a view or line of sight 745 to the target 720. An object 750 blocks or obstructs the view or line of sight 745 to the target 720.

FIG. 7A includes an X-Y-Z coordinate system in which the lines of sight 715 and 745 are located in an X-Y plane. An angle 755 (shown as θ) exists between the lines of sight 715 and 745 in this X-Y plane. Further, the figure shows a distance A from user 700 and wearable electronic device 710 to target 720, a distance B from user 700 and wearable electronic device 710 to user 730 and wearable electronic device 740, and a distance C from user 730 and wearable electronic device 740 to target 720.

For illustration, target 720 is shown as a three dimensional cube with six sides. Each side of the cube has a different number of dots that indicates a number of the cube (i.e., one side has one dot, one side has two dots, one side has three dots, one side has four dots, one side has five dots, and one side has six dots).

The angle (θ) 755 represents an offset, rotation, or difference from the line of sight 715 to the line of sight 745. This angle provides information as to the different orientations or profiles visible, sensible, or detectable along the respect lines of sight.

Figure 7B:
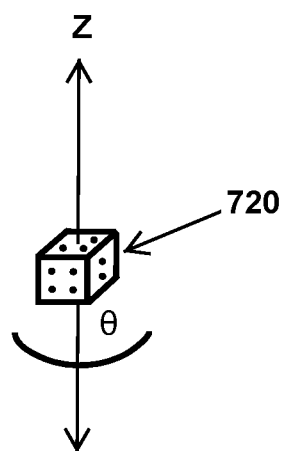
FIG. 7B shows the target being rotated θ degrees about the Z-axis in accordance with an example embodiment.

FIG. 7B shows the target 720 being rotated θ degrees about the Z-axis. Given that the original orientation of the target 720 was along line of sight 715, this rotation determines the amount of adjustment to an orientation for user 730 and electronic device 740. For example, if θ is ninety degrees (90°) about the Z-axis, then the difference in orientations between electronic device 710 and electronic device 740 is ninety degrees (90°). An image or model built from the perspective along line of sight 715 would be rotated or adjusted ninety degrees (90°) along the Z-axis to provide an orientation for the view along the line of sight 745.

In FIG. 7A, target 720 shows three sides of the cube that represent the view of the user 700 or wearable electronic device 710 along the line of sight 715. In FIG. 7B, target 720 shows three sides of the cube that represent the view of the user 730 or wearable electronic device 740 along the line of sight 745.

The user 730 and wearable electronic device 740 are not able to view the target 720 since the target is obstructed or blocked with object 750. For instance, the user 730 and wearable electronic device 740 may not know of the existence or presence of the target since they are unable to see it. Further, the user 730 and wearable electronic device 740 may not know the location of the target, the distance to the target, the activity of the target, the orientation of the target, the image of the target (e.g., what the target looks like), or the identity of the target since they are unable to see the target.

Wearable electronic device 710 gathers or captures information that assists the wearable electronic device 740 in determining one or more of the existence or presence of the target, the location of the target, the distance to the target, the activity of the target, movement or activity of the target, the orientation of the target, the image of the target (e.g., what the target looks like), or the identity of the target.

By way of example, the wearable electronic device 710 captures one or more images of the target 720 and builds a 3D model of the target. The wearable electronic device 740 displays the 3D model of the target to the user 730 with an orientation that matches an orientation the user 730 and wearable electronic device 740 would see of the target if the target were not obstructed or blocked by the object 750. Knowing a location of the user 730 and the wearable electronic device 740 with respect to the target 720 and the user 700 and the wearable electronic device 710, the 3D model is rotated or built to present an orientation to the user 730 and wearable electronic device 740 that matches the actual, real orientation of the target from their location.

Figure 7C:
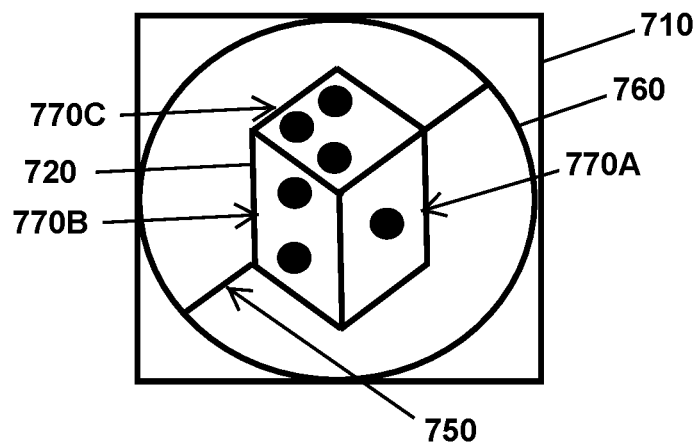
FIG. 7C shows a display of one electronic device of FIG. 7A in accordance with an example embodiment.

FIGS. 7A and 7C show the electronic device 710 with a display 760 that displays the target 720 to the user 700. The display 760 displays three faces 770A, 770B, and 770C of the target 720 and provides the user 700 with the orientation along the line of sight 715. The user 700 sees the target 720 as it appears along the line of sight 715 since the target is not obstructed with the object 750.

Figure 7D:
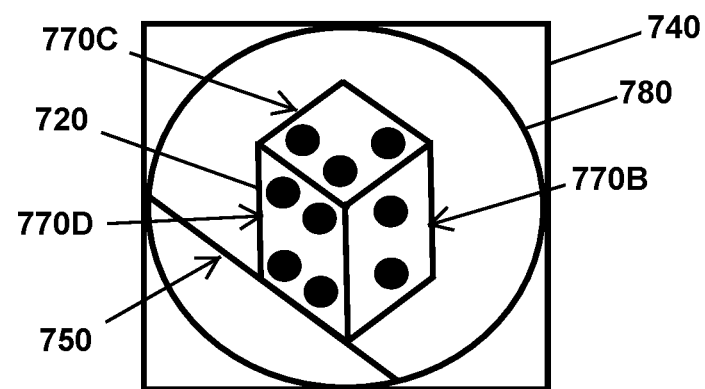
FIG. 7D shows a display of another electronic device of FIG. 7A in accordance with an example embodiment.

FIGS. 7A and 7D show the electronic device 740 with a display 780 that displays the target 720 to the user 730. The display 780 displays three faces 770B, 770C, and 770D of the target 720 and provides the user 730 with the orientation along the line of sight 745. The user 730 is thus able to see the target 720 along the line of sight 745 at the target would appear if the target were not obstructed with the object 750.

Figure 8A:
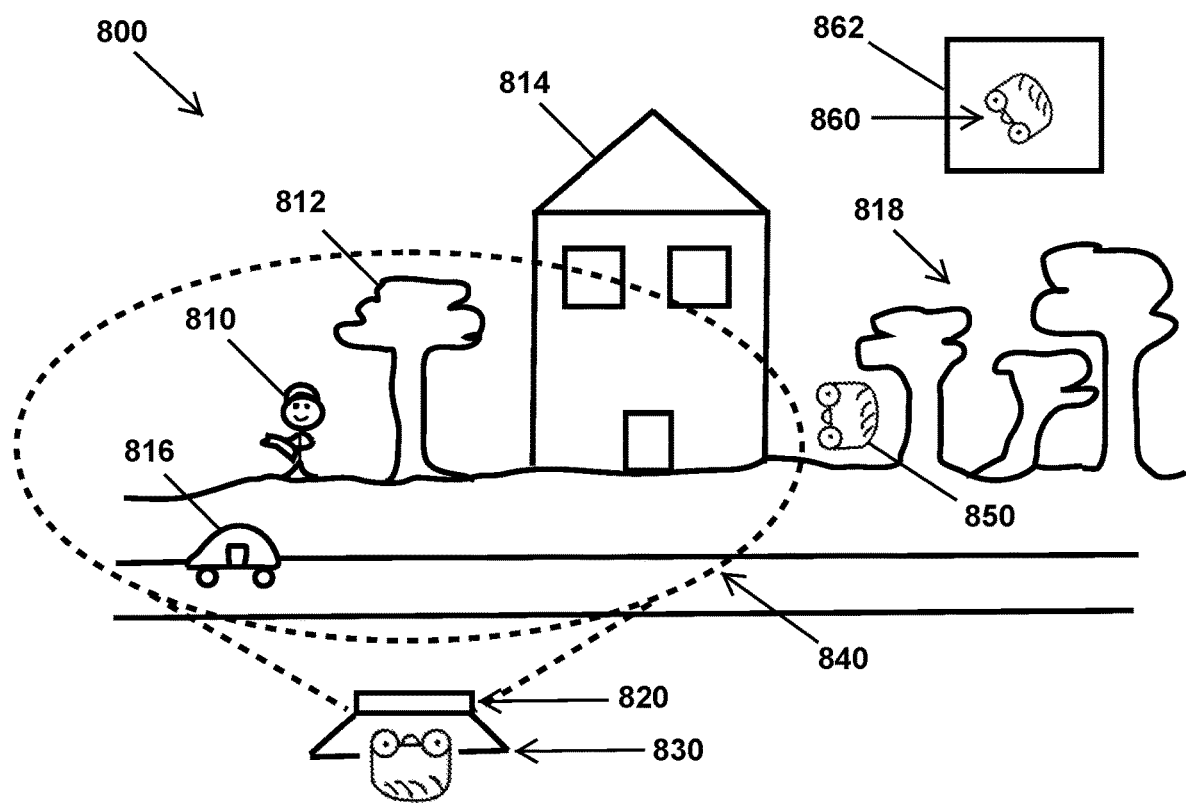
FIG. 8A shows a view of a residential neighborhood with electronic devices in accordance with an example embodiment.

FIG. 8A shows a view of a residential neighborhood 800 that includes a target 810 (shown as a person holding an object) next to a tree 812 on one side of a house 814, an automobile 816, and a group of trees 818 on another side of the house 814. A handheld electronic device 820 with a user 830 determines information about the residential neighborhood 800 in a field of view 840. By way of example, this information includes one or more of photos, video, images (such as infrared images or other sensed images), audio, GPS locations and distances of objects and people in the residential neighborhood, and other information discussed herein. The electronic device 820 moves to determine the information from various angles, positions, locations, lines of sight, and/or fields of view.

The residential neighborhood includes a second user 850 that stands between the house 814 and the group of trees 818. The second user 850 looks in the direction of the target 810 but is unable to view the target 810 since the house 814 blocks or obstructs a view of the target 810.

The residential neighborhood also includes a third user 860 that is located in a house 862 (see also FIG. 8C) several blocks away from the house 814. The third user 860 looks in the direction of the target 810 but is unable to view the target 810 since the house 814 and other objects in the neighborhood block or obstruct a view of the target 810.

Figure 8B:
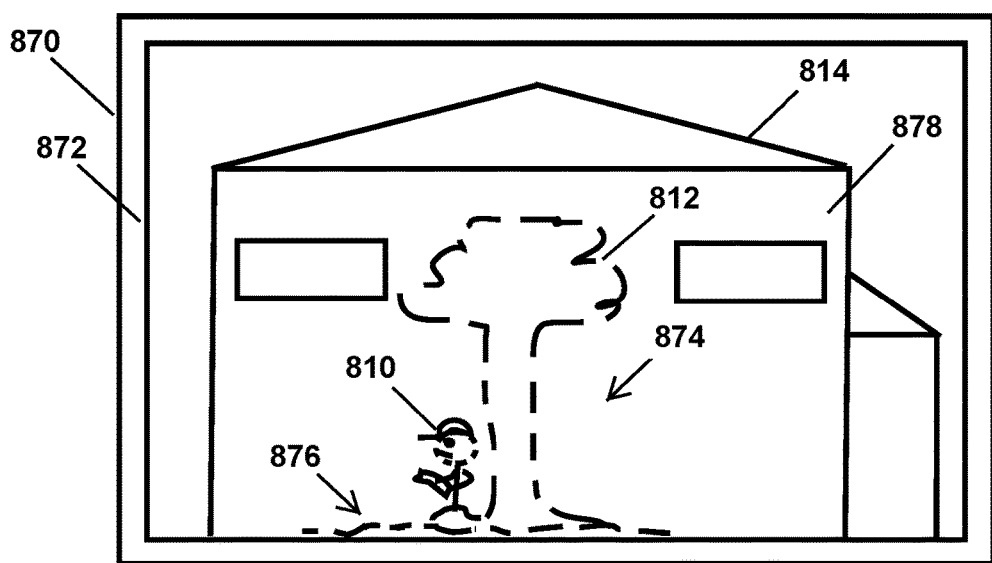
FIG. 8B shows a display of an electronic device of FIG. 8A in accordance with an example embodiment.

Looking also to FIG. 8B, a portable electronic device 870 with the second user 850 includes a display 872 that provides a view of the electronic device 870 and/or second user 850. Without the assistance of the electronic device 870, the second user 850 would be unable to see or view the target 810 since the house 814 is located between the second user 850 and the target 810 and thus blocks a view of the target 810. The display 872 of the second electronic device 870 displays the target 810 and an area of the target 874 that includes the tree 812 and a ground area 876 where the target 874 stands.

The display 872 displays actual images or a 2D or 3D image or model of the target 810 and the area of the target 874 on or over the house 814 since this is the view that the second user 850 and/or electronic device 870 would see if a view of the target were not obstructed with the house. A size of the target 810 and objects in the area of the target 874 appear on the display 872 and/or to the user 850 with a size based on a distance from the second user 850 and/or electronic device 870 to the target 810. For example, their size is inversely proportionally to the distance to them.

Furthermore, an orientation or profile of the target 810 and the area of the target 874 are displayed as the second user 850 and/or electronic device 870 would see the target and the area of the target if these objects were not obstructed. For example, the target 810 in FIG. 8A has a forward facing or front profile or orientation to the electronic device 820 and user 830. The target 810 in FIG. 8B, however, has a side facing or side profile or orientation to the electronic device 870 and user 850.

The target 810 and the area of the target 874 are visually distinguished on the display from objects in a line of sight of the second user 850 and/or electronic device 870. This visual distinction enables a user to distinguish between objects that are in the line of sight of the electronic device and/or second user (e.g., a side 878 of the house 814) and objects being displayed that are obstructed and not in the line of sight of the electronic device and/or second user (e.g., the target 810 and the area of the target 874). By way of the example, the objects being displayed that are obstructed and not in the line of sight of the electronic device are displayed with visual distinction using one or more of dashed lines, different colors or tones or brightness, highlights, modeled images, 2D images, 3D images, augmented images, indicia, text, and other techniques to visually distinction or identify the objects being displayed that are obstructed and not in the line of sight of the electronic device.

In some instances, providing a user and/or electronic device with images of the target and area of the target may not be sufficient to provide a visual reference frame for a location and/or activity of the target. In addition to displaying the target and/or area of the target, an electronic device can display a reference frame for the obstructed target.

Figure 8C:
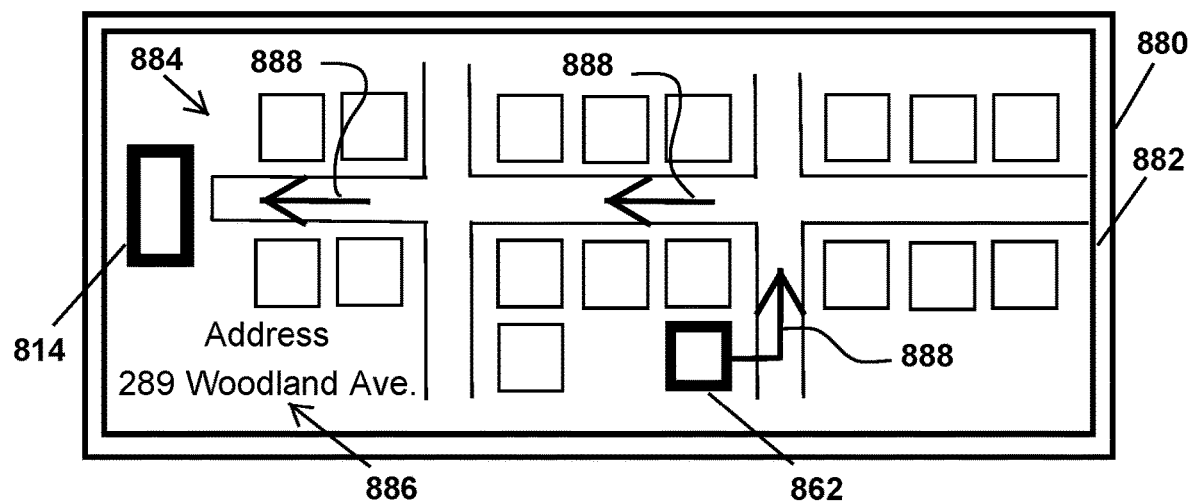
FIG. 8C shows a display of another electronic device of FIG. 8A in accordance with an example embodiment.

Looking also to FIG. 8C, an electronic device 880 with the third user 860 includes a display 882 that provides images or video of a reference frame for a location and/or activity of the target 810. By way of example, this reference frame includes a map 884 of the residential neighborhood. The map 884 shows that the house 862 of the third user 860 is located several blocks away from the house 814 where the target 810 is located. The map 884 also includes an address 886 of the house 814 and arrows 888 showing directions how to get from house 862 to house 814.

Figure 8D:
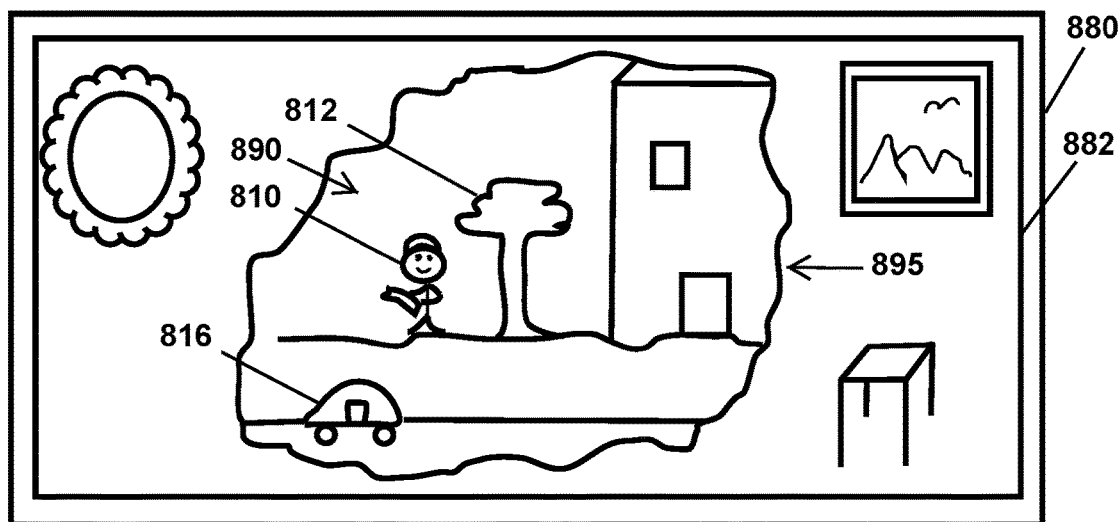
FIG. 8D shows the display of the other electronic device in accordance with an example embodiment.

Looking also to FIG. 8D, the display 882 of the electronic device 880 also displays images, photos, and/or video of the target 810 and an area of the target 890 that includes images, photos, and/or video of the tree 812 and automobile 816. Without the assistance of the electronic device 880, the third user 860 would be unable to see or view the target 810 since houses (such as house 814 and house 862) and other objects in the neighborhood block a view of the target 810.

The electronic device 880 overlays, provides, or displays on the display 882 a view 895 of the real-time view that the first user 830 and/or first electronic device 820 sees, detects, captures, determines, and/or senses in the field of view 840.

This view 895 is a snapshot of the field of view 840 and can include or be the field of view 840 or include or be a portion of the field of view 840. For example, the view can be a fraction or portion of the field of view 840 with some portions of the field of view being omitted. As another example, the view can include additional or more objects or views than the field of view, such as include images in a current field of view and images in a previous or another field of view.

A size and/or shape of the view 895 can vary. For example, FIG. 8D shows the view with a wiggled, rippled, or waved circular or oval shape, but the view can have other shapes as well (such as a square shape, a circular shape, a rectangular shape, an oval shape, a polygonal shape, etc.). The closed wiggled, rippled, or waved contour or closed perimeter distinguishes the view and images in the view from the real or actual view.

Further, the view 895 can be stationary or movable. For example, the electronic device 880 sets or associates the view at certain coordinate location, compass direction, a GPS location, direction of view, direction of gaze or focus, line of sight, field of view, etc. For instance, display or show the view when a line of sight or field of view of an electronic device and/or user is directed toward a location of the target or a designated point in space (e.g., a point in space designated to include the view). For instance, display the view when a user and/or electronic device views or points to the ground or another designated direction or location (such as a specific angle, degree, or compass direction).

Consider an example in which the view 895 appears at a location on a see-through or transparent display. The location coincides with the location of where the target is actually located, or the location coincides with a designated location for where a user can look or point the electronic device to display the view. For instance, display the view when the electronic device and/or user looks, directs, points, tilts to an arbitrary point or location in space, a predetermined point or location in space, or a designated point or location in space. The view provides a virtual reality or an augmented reality view that enhances the actual view with digital images overlaid onto real images.

Consider an example in which John holds his smartphone while he stands outside of a building waiting for his friend Paul who is located inside of the building. John points a face or side of the smartphone at different locations along his view of the building. When a line of sight or a point of aim of the face or side of the smartphone coincides or includes the location of Paul, then a display on the smartphone shows a real-time virtual image of Paul. John is thus able to see where Paul is located inside of the building since the line of sight or the point of aim of the face or side of the smartphone points to where Paul is located. The virtual image of Paul disappears when the line of sight or the point of aim of the face or side of the smartphone no longer points to where Paul is located.

By way of example, electronic device 880 is a pair of electronic glasses that the user 860 wears. When the user 860 looks in the direction of the target 810, the display 882 displays an image of the target 810 and area of the target 890. The target 810 and the area of the target 890 disappear or are removed when the user 860 looks in a different direction (i.e., away from the target 810).

An electronic device can simultaneously display, track, and/or include multiple different targets at multiple different locations. The electronic device can filter certain targets from being displayed while selecting other targets to be displayed. A decision as to whether to display a target or not to display a target can be based on any one of various factors that include, but are not limited to, a location of the target, a distance to the target, a relationship to the target, a membership of the target, an identification or name of the target, an object with or near the target, an activity of the target, or another factor relating to the target and/or a user.

By way of example, an electronic device includes targets within a geographical radius of five hundred meters (500 m), includes targets of people that are members to a social network to which the user also is a member, includes targets within a building, includes targets within a city, includes targets in a room, includes targets with weapons or firearms, includes target with a familial relation to a user, includes targets identified as a combatant or criminal, includes targets selected by a user or another electronic device, includes targets with a personal profile that matches a personal profile of a user, etc.

Consider an example in which a user belongs to a social network (such as FACEBOOK) and has fifty other users or friends that also belong to this social network. Electronic devices of the users or members display images, locations, activities, and/or other information discussed herein of the fifty other users while excluding non-members of the social network.

Consider an example in which two friends (John and Paul) agree to collect and share information from their handheld portable electronic devices (HPEDs). The HPEDs collect and determine information as discussed herein. For instance, each HPED determines one or more of a location of the user, an activity of the user, an orientation or profile of the user, a direction a user is facing, an object a user is holding, a 2D or 3D image of a user, video of a user, and audio of a user. When an HPED of John points in a compass direction of where Paul is located, John's HPED shows a real-time image of Paul and other information discussed herein. When an HPED of Paul points in a compass direction of where John is located, Paul's HPED shows a real-time image of John and other information discussed herein. The HPEDs of John and Paul also display maps with a visual indication of their location on the map (e.g., display a dot, a pin, an arrow, or other indicia to indicate a present location of the HPED and/or user on the map). When John or Paul activates the visual indication through a user interface (e.g., touch the display at the visual indication), then the display shows the image of the target at the location as discussed herein.

Consider an example in which John and his friends belong to a social network. When a friend is within a predetermined proximity of John, an electronic device of John displays a visual indication of the friend. By way of example, this visual indication instructs John in which direction to look to see an image of his friend, a location of where the friend is located, a distance to the friend, an image of the friend, or other visual information discussed herein. Further, John's electronic device displays a map that indicates where each friend is located. An enlargement of the map at a location of a friend shows images of the friends as discussed herein. John can navigate from map location to map location of friends to see images of what each friend is doing, where the friend is located, an area of the friend, objects with which the friends are interacting, video and audio of the friends, and other information discussed herein.

Consider an example in which soldiers in a platoon have electronic devices that capture and determine information as discussed herein. This information is shared in a private peer-to-peer network to enable the soldiers to locate, track, identify, determine, and display enemy combatants.

In an example embodiment, generation, display, determination, and/or transmission of images of a target occur in response to a request from a human and/or an electronic device. Consider an example in which images of a target are stored at a network location and are continually updated in real-time as new or updated information about the target is received. A camera of an electronic device points in a direction of the target but is unable to view the target due to an object that obstructs the target. The camera captures an image of the object, and object recognition software identifies the object as an obstruction to viewing the target. The electronic device communicates its location and a point of aim of the camera to the network location and transmits a request for real-time images of the target. In response to this request, the network location transmits the images of the target to the electronic device, and the images are displayed on the electronic device with the orientation or profile that the camera would see if the object did not obstruct the target.

Consider an example in which two portable and/or wearable electronic devices determine information about a target at a geographical location. A first one of these electronic devices determines a location and a first orientation of a target (such as a person holding a weapon) that are visible with a naked eye of a first user and that are visible through or with the first electronic device. A second one of these electronic devices obtains the information determined with the first electronic device and hence determines the location of the target. The target is not visible and/or detectable to the second electronic device since an object obstructs or blocks a view of the second electronic device to the target. For instance, object and/or facial recognition software determines that the target is not visible at the location with a naked eye of the second user because objects obstruct the second user from seeing the target at the location. Based on one or more of the locations of target, the first electronic device, and the second electronic device, a placement location for the target is determined. This placement location is where the target would be visible to the naked eye of the second user in a field of view of the second user if the target were not obstructed by the objects. Analysis of information collected with the first electronic device determines a first orientation of the target at the location. For example, this first orientation includes a profile, position, or direction of gaze of the target from the point of view or field of view of the first electronic device. Analysis of the information collected with the first and/or second electronic devices also determines a second orientation of the target at the location. For example, this second orientation includes a profile, position, or direction of gaze of the target from the point of view or field of view of the second electronic device. For instance, this second orientation depicts how the target would be oriented at the location to the naked eye of the second user in the field of view of the second user if the target were not obstructed by the objects. A 3D modeler constructs 3D images of the target and/or an area surrounding the target. A display of the second electronic device displays the 3D images of the target having the second orientation and being located at the placement location in the field of view of the second user such that the 3D images of the target appear in the field of view of the second user where the target would be visible to the naked eye of the second user in the field of view of the second user if the target were not obstructed by the objects.

Consider further the example above in which two electronic devices determine information about the target at the geographical location. The second electronic device determines a distance from the second electronic device to the target. Based on this distance, a determination is made of a size of the target (including an object the target holds or includes) that would appear in the field of view of the second user if the target were not obstructed by the objects and visible with the naked eye of the second user in the field of view of the second user. The second electronic device displays the 3D images of the target with the size of the target that would appear in the field of view of the second user if the target were not obstructed by the objects and visible with the naked eye of the second user in the field of view of the second user.

Consider further the example above in which two electronic devices determine information about the target at the geographical location. An electronic device determines, from the information collected with the first electronic device, a 3D image of an area that is proximate to the target. The second electronic device displays this 3D image of the area that is proximate to the target such that the 3D image of the area appears with the 3D images of the target in the field of view of the second user where the area would be visible to the second user in the field of view of the second user if the area were not obstructed by the objects and visible with the naked eye of the second user in the field of view of the second user.

Consider further the example above in which two electronic devices determine information about the target at the geographical location. An electronic device determines a facial image from the information collected and an identity of a person of the facial image. The 3D images of the target are drawn to resemble the identity of the person and displayed on the second electronic device.

Consider further the example above in which two electronic devices determine information about the target at the geographical location. The second electronic device detects movement from its current field of view that includes the location of the target to another field of view that does not include the location of the target. But for the objects obstructing the target, the target would visible in the current field of view, but the target is not visible in the other field of view since this other field of view does not include the location of the target even if the target were not obstructed. In response to detecting the movement of the second electronic device to the other field of view, the second electronic device removes the 3D images of the target being displayed through the second electronic device. Removal of the 3D images occurs at a time when the field of view of the second electronic device and/or second user no longer includes the location of the target even if the target were not obstructed by the objects.

Consider further the example above in which two electronic devices determine information about the target at the geographical location. An electronic device analyzes the collected information and determines movement of the target. The second electronic device displays movement of the 3D images of the target to coincide in real time with the movement of the real target as captured with the first electronic device of the first user.

Consider further the example above in which two electronic devices determine information about the target at the geographical location. The second electronic device detects movement from its current field of view that includes the location of the target to another field of view that does not include the location of the target. In response to this detection, the second electronic device displays a visual indication that indicates a direction of the location in order to visually inform the second user where to look in order to see the 3D images of the person and the weapon at the location. Based on this visual indication, the second user knows in which direction to turn his head or his gaze in order to see the 3D images of the person since these images are located at the placement location that represents the actual location.

Consider an example of an electronic system that includes a first electronic device, a second electronic device, and a computer that communicate with each other over a network (such as a wireless network). A camera with the first electronic device captures an image of an object and a person in a field of view of a first user wearing or using the first electronic device. A camera with the second electronic device captures an image of the object without the person since the person is blocked or obstructed by the object (e.g., located behind the object) and not within a field of view of a second user wearing or using the second device. The computer receives or obtains the image of the object and the person from the first electronic device and receives or obtains the image of the object without the person from the second electronic device. With this information, the computer creates a three dimensional (3D) image of the person to resemble the person, determines a location of where the person would appear in the field of view of the second user if the object were not obstructing the person in the field of view of the second user, determines an orientation of what profile of the person that the second user would see in the field of view of the second user if the object were not obstructing the person in the field of view of the second user, and transmits the 3D image of the person to the second electronic device. A display of the second electronic device displays the 3D image of the person at the location and with the orientation in the field of view of the second user as if the object were not obstructing the person in the field of view of the second user.

Consider further the example above of the electronic system that includes the first and second electronic devices and computer that communicate with each other over the network. The second electronic device displays the 3D image of the person with a shape, a size, and an orientation that matches a shape, a size, and an orientation of the real, actual person located behind the object. The shape, the size, and the orientation match what the second user and/or second electronic device would see if the person were not obstructed with the object.

Consider further the example above of the electronic system that includes the first and second electronic devices and computer that communicate with each other over the network. The computer moves the 3D image of the person to match real time movement of the person located behind the object even though the person is not visible with a naked eye of the second user in the field of view of the second user. Movement of the 3D image correlates or coincides with movement of the real person as determined from information collected with the first electronic device.

Consider further the example above of the electronic system that includes the first and second electronic devices and computer that communicate with each other over the network. The display of the second electronic device removes the 3D image of person when the field of view of the second user and/or second electronic device moves to a location that no longer includes the object. For example, the camera of the second electronic device moves such that its field of view no longer includes the location of the person. The 3D image of the person reappears on the display of the second electronic device when the field of view of the second user and/or second electronic device moves back to the location that includes the person.

Consider further the example above of the electronic system that includes the first and second electronic devices and computer that communicate with each other over the network. With the information received from the first and/or second electronic devices, the computer creates a 3D image of a portion of the object that is visible to the first user and/or first electronic device but not visible to the second user and/or second electronic device and transmits the 3D image of the portion of the object to the second electronic device. The display of the second electronic device displays the 3D image of the portion of the object such that the second user sees the object supplemented with the 3D image of the portion of the object that is not visible to the second user and/or second electronic device.

Consider further the example above of the electronic system that includes the first and second electronic devices and computer that communicate with each other over the network. The display of the second electronic device displays a distance from the second user and/or second electronic device to the person even though the person is not visible with a naked eye of the second user and/or visible to the second electronic device in the field of view of the second user and/or second electronic device.

Consider further the example above of the electronic system that includes the first and second electronic devices and computer that communicate with each other over the network. The computer analyzes the image of the person from the first electronic device, determines that the person holds a firearm pointed in a direction, and transmits the 3D image of the person holding the firearm to the second electronic device. A display of the second electronic glasses displays the 3D image of the person holding the firearm pointed in a direction that matches the person holding the firearm pointed in the direction even though the person and the firearm are not visible with a naked eye of the second user and/or visible to the second electronic device in the field of view of the second user and/or second electronic device but are visible with a naked eye of the first user and/or visible to the first electronic device.

Consider an example in which a computer system includes one or more electronic devices that execute a method. The computer system obtains, from a first electronic device, an image of a person holding a weapon at a location visible in a field of view of a first user wearing or using the first electronic device. The computer system creates, from the image of the person holding the weapon at the location, 3D images of the person, the weapon, and the location such that the 3D images show the person holding the weapon at the location. The computer system obtains, from second electronic device, an image of an object that blocks a field of view of a second electronic device and/or second user wearing or using the second electronic device from seeing or sensing the person holding the weapon at the location. A determination is made of a placement location in the field of view of the second user and/or second electronic device where to position the 3D images of the person, the weapon, and the location such that the 3D images of the person, the weapon, and the location at the placement location show the person holding the weapon at the location as the person holding the weapon at the location would appear in the field of view of the second user and/or second electronic device if the object were not blocking the second user and/or second electronic device from seeing the person holding the weapon at the location. A display of the second electronic device displays, over the object in the field of view of the second user and/or second electronic device, the 3D images of the person, the weapon, and the location at the placement location such that the field of view of the second user and/or second electronic device shows the person holding the weapon at the location as if the object were not blocking the second user and/or second electronic device from seeing the person holding the weapon at the location.

Consider further the example in which the computer system includes one or more electronic devices that execute the method. The computer system determines, from the image of the person holding the weapon at the location, an orientation of the weapon and a point of aim of the weapon and further adjusts the 3D images of the person, the weapon, and the location to match the orientation of the weapon and the point of aim of the weapon. The display of the second electronic device displays, over the object in the field of view of the second user, the 3D images of the person, the weapon, and the location such that the field of view of the second user and/or second electronic device shows the person holding the weapon with the orientation and the point of aim at the location as if the object were not blocking the second user and/or second electronic device from seeing the person holding the weapon with the orientation and the point of aim.

Consider further the example in which the computer system includes one or more electronic devices that execute the method. The second electronic device switches views from displaying the 3D images of the person, the weapon, and the location over the object in the field of view of the second user and/or second electronic device to displaying real time images from the first electronic glasses that show the person holding the weapon at the location in the field of view of the first user and/or first electronic device.

Consider further the example in which the computer system includes one or more electronic devices that execute the method. The second electronic glasses displays a visual indication that provides a compass direction of the location of the person holding the weapon with respect to a location of the second electronic glasses. When the second electronic glasses move its camera to point in the compass direction, the display of the second electronic glasses displays the 3D images of the person, the weapon, and the location.

Consider further the example in which the computer system includes one or more electronic devices that execute the method. When the second electronic glasses move its camera to point away from the compass direction, the display of the second electronic glasses removes the 3D images of the person, the weapon, and the location from being displayed.

Consider further the example in which the computer system includes one or more electronic devices that execute the method. The display of the second electronic glasses displays, on a see-through display, the 3D images of the person, the weapon, and the location in a view that has a waved circular shape with a closed configuration.

Figure 9:
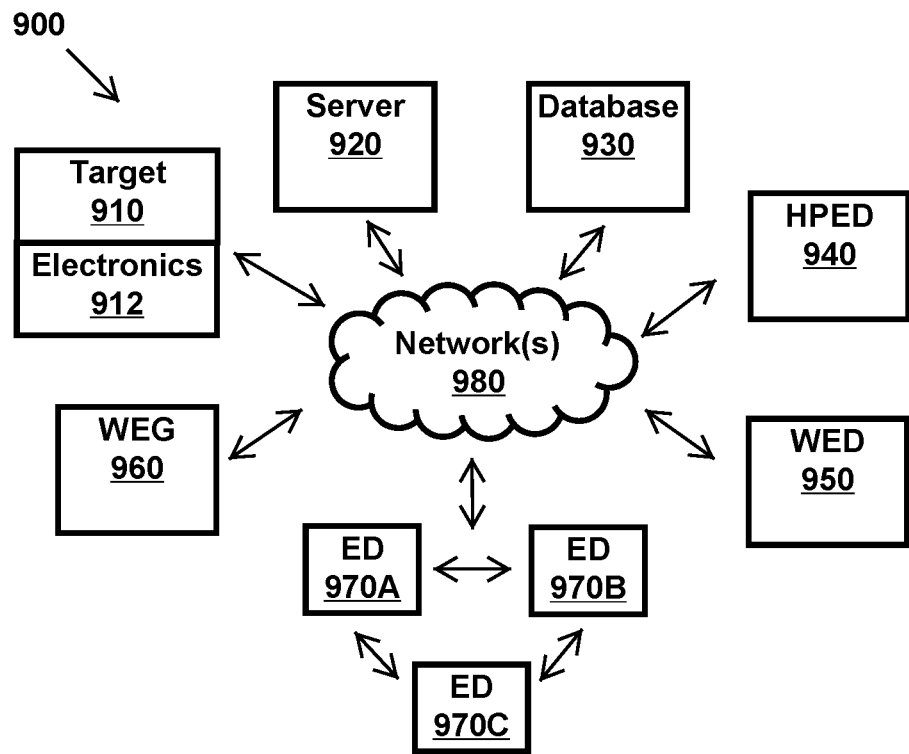
FIG. 9 is an electronic device system or a computer system in accordance with an example embodiment.

FIG. 9 is an electronic device system or a computer system 900 that includes one or more of the following: a target 910 including or in communication with electronics or an electronic device 912, a server 920, a database 930 or other storage, a handheld portable electronic device or HPED 940, a wearable electronic device or WED 950, wearable electronic glasses or WEG 960, a plurality of electronic devices 970A, 970B, and 970C, and one or more networks 980 through which electronic devices can communicate (such as wirelessly communicate).

Figure 10:
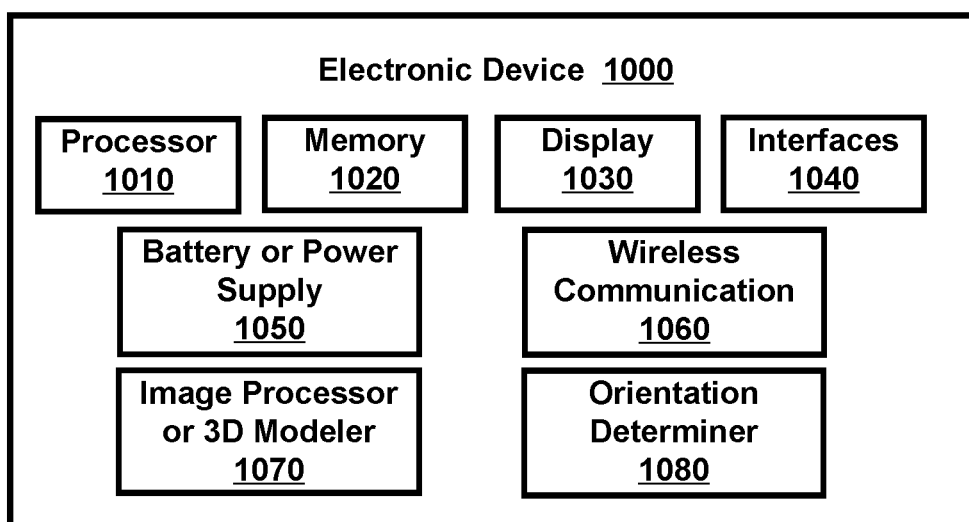
FIG. 10 is an electronic device in accordance with an example embodiment.

FIG. 10 is an electronic device 1000 that includes one or more of the following: a processing unit or processor 1010, a computer readable medium (CRM) or memory 1020, a display 1030, one or more interfaces 1040 (such as a network interface, a graphical user interface, a natural language user interface, and/or an interface that combines reality and virtuality), a battery or a power supply 1050, wireless communication 1060, an image processor or a 3D modeler 1070, and an orientation determiner 1080 (such as a system that executes one or more example embodiments discussed herein to determine an orientation of a target).

Figure 11:
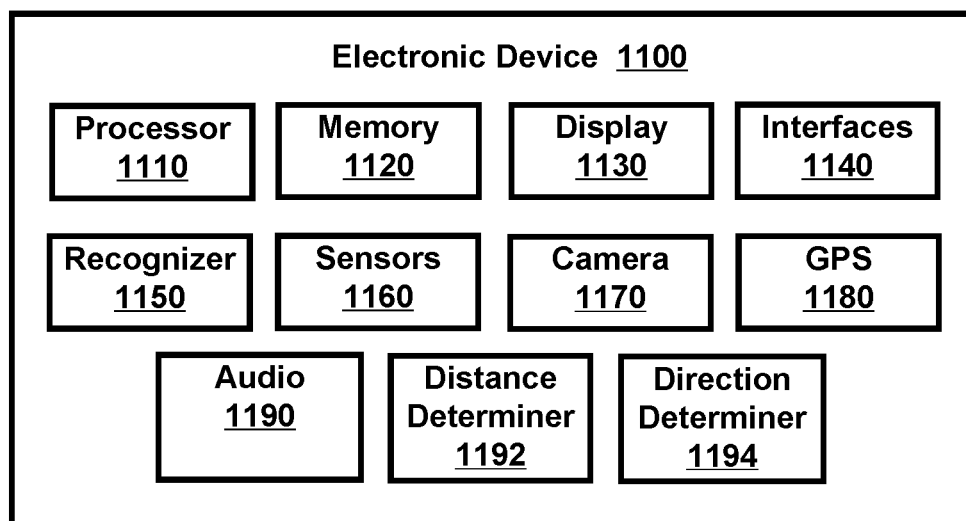
FIG. 11 is another electronic device in accordance with an example embodiment.

FIG. 11 is an electronic device 1100 that includes one or more of the following: a processing unit or processor 1110, a computer readable medium (CRM) or memory 1120, a display 1130, one or more interfaces 1140 (such as a network interface, a graphical user interface, a natural language user interface, and/or an interface that combines reality and virtuality), one or more recognizers 1150 (such as object recognition software, facial recognition software, and/or animal recognition software), one or more sensors 1160 (such as micro-electro-mechanical systems sensor, a motion sensor, an optical sensor, radio-frequency identification sensor, a global positioning satellite sensor, a solid state compass, gyroscope, an accelerometer, and/or a weather sensor), a camera 1170, a global positioning system or GPS 1180, audio 1190 (such as a microphone or speakers), a distance determiner 1192 (such as a laser, an electromagnetic wave transmitter/receiver, a rangefinder, and/or a camera), a direction determiner or an orientation determiner 1194 (such as a compass, a magnetometer, a heading indicator, an inclinometer, a gyroscope, an accelerometer, a sensor, or other electrical device to determine direction).

FIGS. 10 and 11 show various components in a single electronic device. One or more of these components can be distributed or included in various electronic devices, such as some components being included in an HPED, some components being included in a server, some components being included in storage accessible over the Internet, some components being in wearable electronic devices or an electronic scope or an electronic sighting device or a weapon or a projectile, and some components being in various different electronic devices that are spread across a network, a cloud, and/or an electronic device system or a computer system.

The processing unit or processor (such as a central processing unit, CPU, microprocessor, application-specific integrated circuit (ASIC), etc.) controls the overall operation of memory (such as random access memory (RAM) for temporary data storage, read only memory (ROM) for permanent data storage, and firmware). The processing unit or processor communicates with memory and performs operations and tasks that implement one or more blocks of the flow diagrams discussed herein. The memory, for example, stores applications, data, programs, algorithms (including software to implement or assist in implementing example embodiments) and other data.

Blocks and/or methods discussed herein can be executed and/or made by a user, a user agent of a user, a software application, an electronic device, a computer, and/or a computer system.

Examples of an electronic device include, but are not limited to, a server, a computer, a laptop computer, a tablet computer, a handheld portable electronic device (HPED), a portable electronic device (PED), a wearable electronic device (WED), wearable electronic glasses (WEG), an electronic scope, electronic binoculars, a smartphone, a camera, a non-portable electronic device, a movable or flyable electronic device, and an electronic device with a processor, a memory, and a display.

As used herein, "augmented reality" is a view of the real, physical world in which elements are augmented or modified with computer or processor generated input, such as sound, graphics, GPS data, video, and/or images. Virtual images and objects can be overlaid on the real world that becomes interactive with users and digitally manipulative.

As used herein, "determine" includes to ascertain, to calculate, to decide, to obtain, to discover, to retrieve, and/or to receive.

As used herein, "field of view" or "field of vision" is the extent of the observable world that is seen or captured at a given moment.

As used herein, "firearm" is a portable gun, such as a rifle or a pistol.

As used herein, "line of sight" is a straight line that extends from the scope, camera, or other sighting apparatus to the target.

As used herein, "naked eye" is visual perception unaided by a magnifying device or a light collecting optical device.

As used herein, "orientation" is a position with relation to points of a compass or other specific directions or locations.

As used herein, "point of aim" is a visual indication of an electronic device that shows where the electronic device is aimed.

As used herein, "target" is one or more of a person, an object, a thing, and an area.

As used herein, "virtual image" or "virtual object" is computer or processor generated image or object. This image or object often appears to a user in the real, physical world (such as a virtual 3D dimensional object that the user views in the real world).

As used herein, "weapon" includes firearms (such as portable guns), archery (such as bow and arrows), light weapons, heavy weapons, and other weapons that launch, fire, or release a projectile.

As used herein, "wearable electronic device" is a portable electronic device that is worn on or attached to a person. Examples of such devices include, but are not limited to, electronic watches, electronic necklaces, electronic clothing, head-mounted displays, electronic eyeglasses or eye wear (such as glasses in which an image is projected through, shown on, or reflected off a surface), electronic contact lenses, an eyetap, handheld displays that affix to a hand or wrist or arm, and HPEDs that attach to or affix to a person.

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

Method blocks discussed herein can be automated and executed by a computer, computer system, user agent, and/or electronic device. The term "automated" means controlled operation of an apparatus, system, and/or process using computers and/or mechanical/electrical devices without the necessity of human intervention, observation, effort, and/or decision.

The methods in accordance with example embodiments are provided as examples, and examples from one method should not be construed to limit examples from another method. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

What is claimed is:

1. Wearable electronic glasses (WEG) comprising:
   one or more sensors that measure a direction of gaze of a user wearing the WEG; and
   a display that automatically displays, in response to the direction of gaze of the user being at a predetermined direction, a virtual image of a map that shows a location of a person that is obstructed and not visible with a naked eye of the user, a compass direction from the user to the person, and a distance from the user to the person,
   wherein the display automatically removes the virtual image of the map in response to the direction of gaze of the user no longer being at the predetermined direction.

2. The WEG of claim 1, wherein the one or more sensors include a camera that tracks the direction of gaze of the user, and the predetermined direction is ground.

3. The WEG of claim 1, wherein the location of the person shown on the virtual map moves in real-time to coincide with movements of the person.

4. The WEG of claim 1, wherein the virtual image of the map includes arrows that show directions how to get from the user to the location of the person, and the WEG automatically displays the virtual image of the map when the WEG moves to a predetermined angle.

5. The WEG of claim 1, wherein the location of the person shown on the virtual image of the map moves in synchronization with real-time movements of the person while the person is obstructed and not visible with the naked eye of the user.

6. The WEG of claim 1, wherein the display displays the person as an infrared image and displays the person as a three-dimensional (3D) image to visually distinguish the person from other objects being displayed.

7. The WEG of claim 1, wherein the display of the WEG displays a three-dimensional (3D) AR image of the person that is built from images of the person captured with second WEG that is in wireless communication with the WEG worn on the head of the user, and the 3D AR image is rotated to have an orientation that the user would see if the person were not obstructed and visible with the naked eye of the user.

8. A method comprising:
   determining a direction of gaze of a user wearing a wearable electronic device (WED) on a head of the user;
   simultaneously displaying, with a display of the WED and in response to determining the direction of gaze of the user is at a designated location, virtual images that include a virtual image that represents a person that is obstructed from view of the user wearing the WED, a compass direction the user is looking, and a distance from the user to the person; and
   automatically removing, from the display of the WED, the virtual images in response to determining the direction of gaze of the user is no longer at the designated location.

9. The method of claim 8, wherein the designated location is ground.

10. The method of claim 8 further comprising:
    moving, on the display of the WED, the virtual image that represents the person to match real-time movements of the person.

11. The method of claim 8 further comprising:
    rotating, on the display of the WED, the virtual image that represents the person to match real-time rotational movements of the person.

12. The method of claim 8 further comprising:
    receiving, at the WED and from the user, a voice command to track the person at which the gaze of the user is directed; and
    highlighting, on the display of the WED and in response to the voice command to track the person, the person as the person moves with respect to the user.

13. The method of claim 8 further comprising:
    sensing, with the WED and from the user, a gesture command to track the person; and
    highlighting, on the display of the WED and in response to the gesture command to track the person, the person as the person moves with respect to the user.

14. The method of claim 8, wherein the designated location occurs when the direction of gaze of the user points to a specific angle.

15. A method comprising:
    determining a direction of gaze of a user wearing a wearable electronic device (WED) on a head of the user;
    simultaneously displaying, with a display of the WED and in response to determining the direction of gaze of the user is at a designated direction, a virtual map and a virtual image that represents a person that is obstructed from view of the user; and
    removing, in response to determining the direction of gaze of the user is no longer at the designated direction, the virtual map and the virtual image that represents the person.

16. The method of claim 15, wherein the designated direction is ground.

17. The method of claim 15 further comprising:
    moving, on the display of the WED, the virtual image that represents the person on the virtual map to match real-time movements of the person.

18. The method of claim 15 further comprising:
    moving the virtual image that represents the person on the virtual map in synchronization with actual movements of the person.

19. The method of claim 15 further comprising:
    capturing an infrared image of the person; and
    enhancing, on the display of the WED and while the person is obstructed and not visible with a naked eye of the user, the infrared image of the person by displaying an augmented reality image over the infrared image of the person.

* * * * *